United States Patent
Hodges

(10) Patent No.: US 10,217,113 B2
(45) Date of Patent: Feb. 26, 2019

(54) AUTHENTICATION SYSTEMS AND METHODS

(71) Applicant: GeoPRI, LLC, Arlington, MA (US)

(72) Inventor: Matthew Hodges, Arlington, MA (US)

(73) Assignee: GeoPRI, LLC, Arlington, MA (US)

( * ) Notice: Subject to any disclaimer, the term of this patent is extended or adjusted under 35 U.S.C. 154(b) by 379 days.

(21) Appl. No.: 14/657,565

(22) Filed: Mar. 13, 2015

(65) Prior Publication Data

US 2016/0267489 A1    Sep. 15, 2016

(51) Int. Cl.
*G06Q 30/00* (2012.01)
*G06Q 10/08* (2012.01)

(52) U.S. Cl.
CPC ......... *G06Q 30/018* (2013.01); *G06Q 10/087* (2013.01)

(58) Field of Classification Search
USPC .......................................................... 705/28
See application file for complete search history.

(56) References Cited

U.S. PATENT DOCUMENTS

| | | | |
|---|---|---|---|
| 6,571,279 B1 | 5/2003 | Herz et al. | |
| 7,475,813 B2 | 1/2009 | Swanson, Sr. | |
| 2004/0186790 A1* | 9/2004 | Briggs | G06Q 10/087 705/26.1 |
| 2007/0215685 A1* | 9/2007 | Self | G06Q 30/06 235/375 |
| 2008/0073432 A1 | 3/2008 | Barenburg et al. | |
| 2008/0120129 A1* | 5/2008 | Seubert | G06Q 10/06 705/35 |
| 2009/0106042 A1 | 4/2009 | Maytal et al. | |
| 2009/0198596 A1* | 8/2009 | Dolan | G06Q 10/06 705/28 |
| 2012/0181330 A1 | 7/2012 | Kim | |
| 2012/0223131 A1 | 9/2012 | Lim et al. | |
| 2016/0055562 A1* | 2/2016 | Kim | G06Q 30/0623 705/26.61 |

OTHER PUBLICATIONS

International Search Report and Written Opinion dated Jul. 25, 2016 in PCT/US16/12044, 8 pages.

* cited by examiner

*Primary Examiner* — Garcia Ade

(74) *Attorney, Agent, or Firm* — Brown Rudnick LLP; Adam M. Schoen

(57) ABSTRACT

The invention systems and methods for managing the issuance or authorization of identifier labels by a third-party certifier for use in distinguishing and/or tracking a product within a supply chain.

19 Claims, 16 Drawing Sheets

AUTHENTICATION SYSTEMS AND METHODS

FIELD OF THE INVENTION

The invention generally relates to authentication systems and methods.

BACKGROUND

A consumer may be interested in knowing specific information about a product they either purchased or are interested in purchasing. In the instance of food, a consumer may want to know the origin of the food product, as well as who produced it, and how it was produced. Accordingly, many companies have chosen to make information regarding their supply chain freely available to consumers, illustrating the fact that the products they sell are manufactured in factories with safe working conditions, by workers that earn a fair wage, using methods that do not damage the environment.

As part of verifying the authenticity of a food product, such as the ingredients or the origin of the product, many companies utilize third-party certification programs. Some certification programs are generally founded on scheduled inspection of production, transfer, and distribution sites. For example, the United States Department of Agriculture (USDA) adopted such an approach for the USDA Organic certification program. Under that regime, any seller seeking to employ the USDA Certified Organic indicia on goods or materials had to be licensed and engage in periodic inspection by authorized verifiers. An enhancement to the certification approach was developed by Fairtrade (Transfair USA and other implementers) in order to increase the efficacy of their certification scheme. In addition to site inspection, Fairtrade certification incorporates an exclusivity requirement whereby retail sellers, as well as other agents along the chain of custody of the product, procure and handle Fairtrade certified products exclusively, which are also subject to inspection.

A problem with those certification programs is that there is limited regulation, such that third-party certifiers may face uncertainty as to whether a seller is correctly representing certification claims to the consumer. For example, current certification programs lack the ability to provide comprehensive regulation for a product as it moves through various stages of the supply chain and possibly exchanges hands multiple times. In the coffee industry, for example, a coffee product may be altered as it moves through the supply chain. During the distribution process, a batch of coffee may be partitioned into smaller portions for consumer purchase (e.g., a batch of roasted coffee beans may be partitioned into individual bags of coffee for retail). In instances such as this, it is difficult for a third-party to determine whether a seller is blending or substituting a certified product from a specific origin with a non-certified product from a different origin, and then representing the mixture as 100% certified. Without a mechanism to detect and constrain that type of activity, it is impossible for a third-party certifier to provide any assurance of validity to the consumer. Therefore, the value of such certification programs is greatly reduced, because the current certification programs allow for adulteration, fraud, or counterfeiting issues to occur, particularly in the food industry where a product is exchanged multiple times or is altered in some way.

SUMMARY

The present invention overcomes the drawbacks of current certification programs and processes by providing a system for managing the issuance and/or authorization of identifier labels by a third-party certifier. Each of the identifier labels may generally include data associated with at least the origin, as well as quantity, of a corresponding product unit to be generated from a larger product lot. The issuance and/or authorization of such identifier labels may be controlled by the third-party certifier so as to reduce the opportunity for fraud, adulteration, or general mislabeling to occur. Upon receiving a request for identifier labels to be associated with product units to be generated from a product lot, it is determined whether the request exceeds the available quantity of the product lot. It should be noted that product lot data may initially be registered and stored, wherein such product lot data may include, but is not limited to, the quantity of product available in the lot. In the event that the request does not exceed the available quantity of the product lot, the request is authorized such that either identifier labels are generated and issued to the requesting party or pre-generated identifier labels are authorized for use. The request will not be authorized in the event that it exceeds the available quantity of the product lot.

Accordingly, the present invention allows the generation and/or authorization of labels is regulated and controlled in such a manner that it decreases the risk of mislabeling, either accidentally or deliberately. More specifically, by limiting the number of labels that can be issued, the present invention reduces the incentive to blend a certified product with a non-certified product as a means of misrepresenting the certification, since labels may only be procured up to the total quantity of the certified product. The "metered" quantity of certified product shown on the label gives the consumer the ability to compare the stated quantity against the actual quantity of the packaged product, making it more difficult to misrepresent uncertified product as certified.

The present invention is advantageous to both a seller and a consumer. For example, the present invention may help to reduce or completely eliminate the costly, and sometime faulty, process of site inspections included as part of current certification programs. The consumer greatly benefits from the comprehensive nature of the certification process provided by the present invention, specifically the metric approach that simply reduces a seller's incentive to misrepresent non-certified product as certified. Accordingly, the present invention reduces the likelihood of fraudulent activities to take place, such as food fraud or adulteration.

Aspects of the invention involve storing product lot data associated with a product lot. The product lot data may include a total quantity of a product lot, a quantity of the product lot that has already been authorized for identifier labels, and an available quantity of the product lot. Upon receiving a request for identifier labels to be associated with one or more product units to be generated from the product lot, it is determined whether the request exceeds the available quantity of the product lot. The request is authorized if the request does not exceed the available quantity of the product lot.

For example, in the instance of coffee distribution, an available quantity of a batch of roasted coffee may be 1,200 ounces (oz.) and the request may include a request for identifier labels to be associated with 100 12-oz. bags of coffee for retail. Accordingly, in this instance, analysis of the request is performed, such that the sum of the quantities of the bags of coffee is compared with the total available quantity of the batch of roasted coffee to determine whether the request is valid. In this instance, there is a sufficient available quantity of the roasted coffee to be evenly partitioned into the 100 12-oz. bags requested, such that the request does not exceed the total available quantity. Accordingly, the requested identifier labels will be authorized (e.g., either generated, activated, and provided to the requestor or activating pre-generated labels).

In some embodiments, the available quantity of the product lot may further be adjusted (e.g., decreased) in response to the quantity of product lot to be associated with the identifier labels of the authorized request. Accordingly, in the event that identifier labels are requested and authorized for 90 12-oz. bags of coffee, the available quantity of the roasted coffee may be adjusted accordingly to account for the allocated quantity of coffee to be associated with the authorized request. For example, the 1,200 ounces of coffee that were originally available may be reduced to 120 ounces, so as to account for the 90 12-oz. bags that have been authorized (e.g., 1,080 ounces that are accounted for).

The data associated with the request may include, for example, an identity of the requestor, characteristics of the requestor, location of the requestor, characteristics of the location of the requestor, identity of the one or more product units to be generated from the product lot, characteristics of the one or more product units to be generated from the product lot, transactional data related to an exchange of the one or more product units to be generated from the product lot, and a combination thereof.

In some embodiments, the characteristics of the one or more product units to be generated from the product lot may include, but are not limited to, size or quantity of product unit, physical attributes of the product unit, origin of the product unit, destination of the product unit, and a combination thereof. The transactional data may include, for example, the identity of at least one entity associated with the exchange of the one or more product units to be generated from the product lot, quantity of the one or more product units exchanged, price paid for the one or more product units, date of the exchange of the one or more product units, and a combination thereof.

The product lot data may further include, but is not limited to, the identity of the product lot, characteristics of the product lot, location of the product lot, identity of product units already authorized for identifier labels, characteristics of the product units, location of the product units, transactional data related to one or more exchanges of product units generated from the product lot, and a combination thereof.

In some embodiments, a module may be configured to output one or more identifier labels, such that, if the request does not exceed the available quantity of the product lot, the module is commanded to generate the requested identifier labels. The module may include a peripheral device configured to generate the requested identifier labels. Each identifier label may include a representation of graphics or text on physical media in response to instructions from the processor.

In some embodiments, the requested identifier labels may be non-activated such that, in the event that the request does not exceed the available quantity of the product lot, the requested identifier labels are activated.

The requested identifier labels may include a machine-readable label including, but not limited to, text, graphics, an image, a linear barcode, a matrix barcode, an RFID element, and a combination thereof.

DETAILED DESCRIPTION

Figure 1:
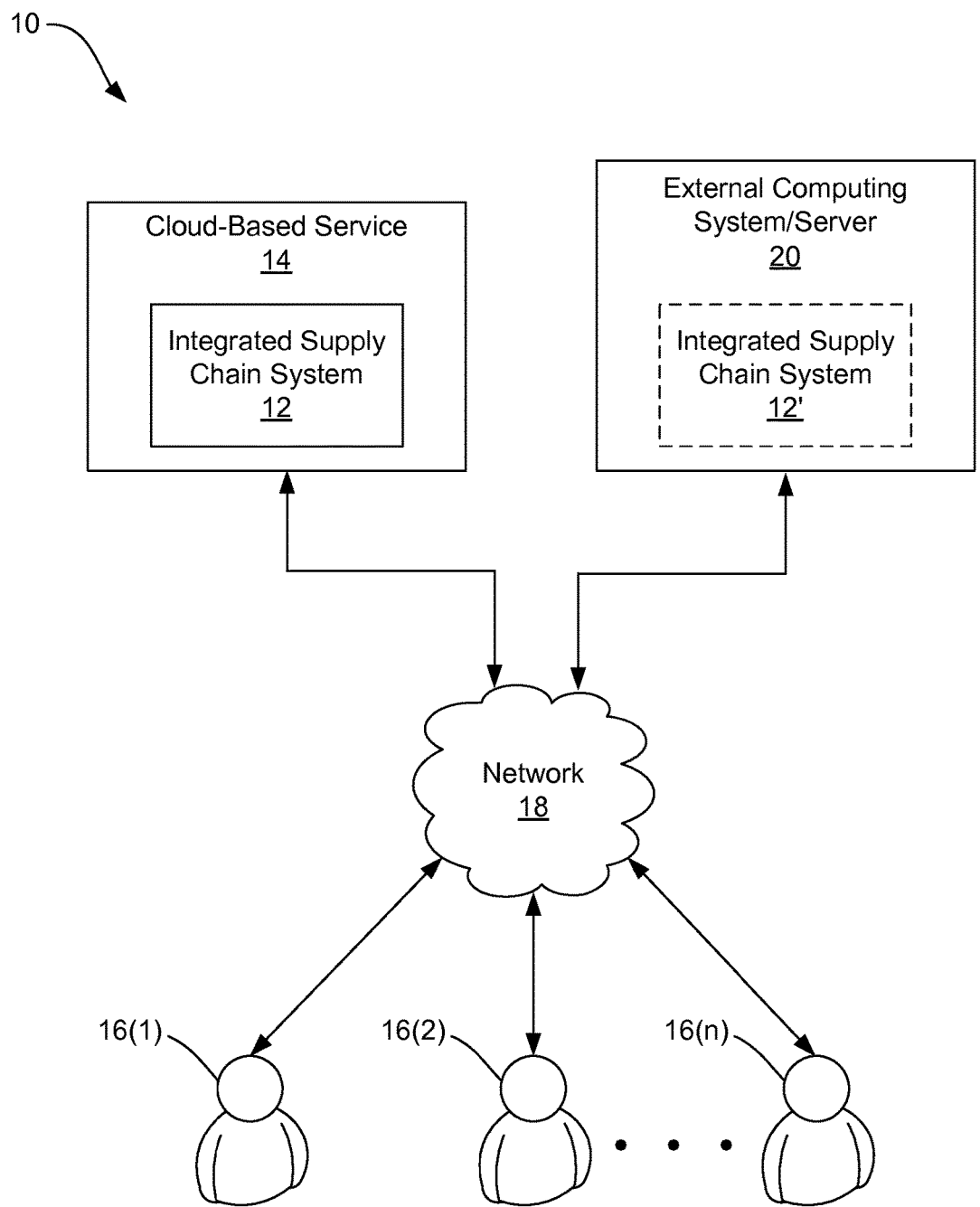
FIG. 1 is a block diagram illustrating one embodiment of an exemplary system for providing traceability and supply chain management.

The invention generally relates to systems and methods for providing traceability and supply chain management of a product, good, resource, or the like. For purposes of discussion, and ease of explanation, the exemplary systems and methods described herein refer to tracking and tracing of a food product, specifically coffee. However, it should be noted that systems and methods of the present invention apply to all types of products, goods, services, resources, and the like, and are not limited solely to food-related product. For example, systems and methods of the present invention may apply to all types of commodities, including agricultural commodity goods, including grains (e.g., corn, oats, wheat, rice, etc.), food goods (e.g., cocoa, salt, sugar, coffee, tea, spices, produce, fruits, vegetables, nuts, seeds (e.g., sesame), legumes, etc.), livestock and meat (e.g., chicken, cattle, hogs, etc.), energy commodity goods (e.g., crude oil, ethanol, natural gas, heating oil, propane, electricity, etc.), hard commodity goods, such as metals (e.g., industrial metals such as copper, lead, tin, aluminum, steel, etc., as well as precious metals such as gold, platinum, silver, etc.), as well as minerals or other mined goods (e.g., coal, precious gemstones, etc.). The systems and methods of the present invention may also apply to other types of goods and products, including, but not limited to, durable goods, such as lumber, furniture, appliances, electronics, toys, as well as nondurable or soft goods, such as textiles, clothing, cleaning products, pharmaceutical products such as medications, and the like.

The present invention discloses various systems and methods for providing improved traceability of a product, as well as improved supply chain management. As generally understood, a supply chain consists of parties involved, either directly or indirectly, in the sequence of activities and/or processes required to bring a product or service from its raw state to the finished state provided to the consumer or requesting customer. The supply chain can include the manufacturer and suppliers, and also transporters, warehouses, retailers, and customers/consumers.

The systems and methods of the present invention generally include an integrated supply chain system configured to provide a platform or interface with which one or more users, specifically members of a supply chain, may interact so as to either manage supply chain activities/processes (e.g., manufacturing and processing, processing of orders, shipments, and the like) or simply access supply chain information associated with a product, such as traceability information or specific product content associated with a product. The integrated supply chain system may generally be embodied as an internet-based computing system, or other external computing configuration, in which there are one or more remote servers networked to allow a centralized data collection and compilation and online access to such data. For example, in one embodiment, the system may be embodied on a cloud-based service, and provide an interface such that users, including, but not limited to, producers, exporters, importers, retailers, and consumers, may access the system and interact with the interface so as to have access to supply chain information and/or management of a product, particularly as a product moves through a supply chain.

FIG. 1 is a block diagram illustrating one embodiment of an exemplary system 10 for providing traceability and supply chain management. As shown, the system 10 includes an integrated supply chain management system 12 embodied on an internet-based computing system/service. For example, as shown, the integrated supply chain management system 12 may be embodied on a cloud-based service 14, for example. The integrated supply chain management system 12 is configured to communicate and share data with one or more users 16(1)-16(n) over a network 18. In the present context, the users 16(1)-16(n) may include one or more members of a supply chain associated with a particular product, for example, a manufacturer, producer, or distributor of the cargo. Additionally, or alternatively, some members of a supply chain 16(1)-16(n) may include a consumer or customer to which the product is to be sold/provided (e.g., single consumer, retailer, store owner, destination owner, etc.). In some embodiments, a user 16 may further include one or more members of a commodity exchange, particularly when the product is a commodity good, such as coffee.

The system 10 further includes an external computing system/server 20 configured to communicate with at least the cloud-based service 14, and subsequently the integrated supply chain management system 12, via the network 18. The external computing system/server 20 may be embodied as a remote server, for example, for communicating with the integrated supply chain management system 12 and for performing the other functions described herein. Similarly, in some embodiments, the integrated supply chain management system 12 may be embodied on the external computing system/server 20. In the embodiments described herein, the external computing system/server 20 may be embodied as a remote server having one or more databases (26-36) associated with the integrated supply chain management system 12, as will be described in greater detail herein.

The network 18 may be any network that carries data. Non-limiting examples of suitable networks that may be used as network 18 include Wi-Fi wireless data communication technology, the internet, private networks, virtual private networks (VPN), public switch telephone networks (PSTN), integrated services digital networks (ISDN), digital subscriber link networks (DSL), various second generation (2G), third generation (3G), fourth generation (4G) cellular-based data communication technologies, Bluetooth radio, Near Field Communication (NFC), the most recently published versions of IEEE 802.11 transmission protocol standards as of February 2015, other networks capable of carrying data, and combinations thereof. In some embodiments, network 18 is chosen from the internet, at least one wireless network, at least one cellular telephone network, and combinations thereof. As such, the network 18 may include any number of additional devices, such as additional computers, routers, and switches, to facilitate communications. In some embodiments, the network 18 may be or include a single network, and in other embodiments the network 16 may be or include a collection of networks.

As described in greater detail herein, the integrated supply chain management system 12 is configured to provide an interface with which the one or more users 16(1)-16(n) may interact for the purposes of either supply chain management or providing traceability information of a product, or other types of information generally related to the product or supply chain activities or events associated with the product, as will be described in greater detail herein.

For example, the integrated supply chain management system 12 is configured to communicate and share data with a device associated with one or more users 16 (hereinafter referred to as user device). The user device may be embodied as any type of device for communicating with the integrated supply chain management system 12 and cloud-based service 14, and/or other user devices over the network 18. For example, at least one of the user devices may be embodied as, without limitation, a computer, a desktop computer, a personal computer (PC), a tablet computer, a laptop computer, a notebook computer, a mobile computing device, a smart phone, a cellular telephone, a handset, a messaging device, a work station, a distributed computing system, a multiprocessor system, a processor-based system, and/or any other computing device configured to store and access data, and/or to execute software and related applications consistent with the present disclosure.

The integrated supply chain management system 12 is configured to receive and analyze data provided thereto from one or more users related to a product. The data is generally related to supply chain activities/processes of the product, including production and handling of the product, exchanges or transactions involving the product, and transportation and movement of the product through the supply chain. Accordingly, users may have access to product data in real-time or near real-time as the product moves in the supply chain. In addition to providing information related to a product, the integrated supply chain management system 12 is configured to improve supply chain management. In particular, the integrated supply chain management system 12 is configured to act as a third-party certifier for issuance and/or authorization of identifier labels for use in tracking and distinguishing a product as it moves through the supply chain. As will be described in greater detail herein, the identifier labels may generally be embodied as a label to be affixed to, or otherwise associated with, a product and can be used in tracking that product as it moves through a supply chain.

In some embodiments, the interface provided by the integrated supply chain system 12 may present information related to the product as well as supply chain management to a user 16 via a display operatively coupled to the user device. The product information may include, but is not limited to, traceability information, general information about the product itself, information about specific activities or processes of the supply chain through which the product has gone through or is scheduled to go through, information about members of the supply chain that may be involved with the product, and the like. The interface may further allow the user to interact with the supply chain management and product information (e.g., filter, sort, access different sets of data, etc.) and further communicate with the integrated supply chain management system 12 (e.g., provide input data). Accordingly, the user 16 is able to have real-time visibility to product information, such as traceability information of a product (such as information related to current location, any previous location, and next destination, etc.), as well as supply chain management data and tools (e.g., assignment of specific data to a product, assignment of an identifier label to a product, updating of product data, etc.).

As will be described in greater detail herein, the integrated supply chain management system 12 of the present invention is configured to allow multiple users to contribute to and draw from a shared flow of data, from the point of origin of the product all the way to sale or delivery to the consumer or customer. More specifically, the system 12 is configured to allow members along a supply chain to exchange information with one another along the entire supply chain, thereby integrating traceability data from all members and allowing such data to be visible. The system 12 is configured to establish connections between users that may be associated with one another, or otherwise share a common interest (e.g., each user plays a role in supply chain of a given product), and thus allow access to traceability data based on the established connections. The system 12 of the present invention contrasts with current supply chain systems which generally utilize an "over-the-fence" model. More specifically, current supply chain systems may consist of many independent closed software systems configured to simply pass data along from one member to the next, with little or no flexibility in how the information is collected or shared. Unlike the integrated supply chain management system 12, the current systems generally pass data along in a chain-like fashion, from one link in the chain to the next.

As previously described, the integrated supply chain system 12 may generally be embodied as an internet-based computing system, such as a cloud-based computing service. Accordingly, the system 12 may generally include a group of remote servers and networks configured to allow centralized data storage related to a product in a supply chain and further allow online access to such data, including traceability information of the product as it moves along the supply chain, as well as management of the supply chain. The integrated supply chain system 12 may be provided to the users 16 via one or more service models associated with the cloud-based service.

In one embodiment, access to the system 12 may be provided via software as a service (SaaS) model. In a SaaS model, a cloud service provider (e.g., third-party provider of system 12) may install and operate the software associated with the integrated supply chain management system 12 in the cloud and users may access the software via their user devices. More specifically, the software is centrally hosted via the cloud and may be accessed and run on the user devices, thereby providing access to the system 12 and the interface with which the user may interact for the purposes of either supply chain management or providing traceability information of a product. The SaaS model eliminates the need to install and run an application directly on a user's own device, simplifying maintenance and support. Furthermore, the users 16 are not responsible for managing the cloud infrastructure and platform where the application runs. Instead, a third-party provider is able to maintain and manage the infrastructure and platforms that run the system hardware and software application.

Other types of cloud-based service models may include, for example, a platform as a service (PaaS) model and an infrastructure as a service (IaaS) model. In the PaaS model, the third-party provider hosts hardware and software on its own infrastructure while providing hardware and software tools to its users as a service. Accordingly, the third-party provider is able to deliver a computing platform to the user device, wherein the platform may include, but is not limited to, an operating system, programming language execution environment, database, and web server, all while hosting the hardware and software on its end. In the IaaS model, a third-party provider may generally provide virtualized computing resources over one or more networks. For example, a third-party provider may host the hardware, software, servers, storage and other infrastructure components on behalf of its users. The third-party provided may also host users' applications and handle tasks including system maintenance, backup and resiliency planning.

Figure 2:
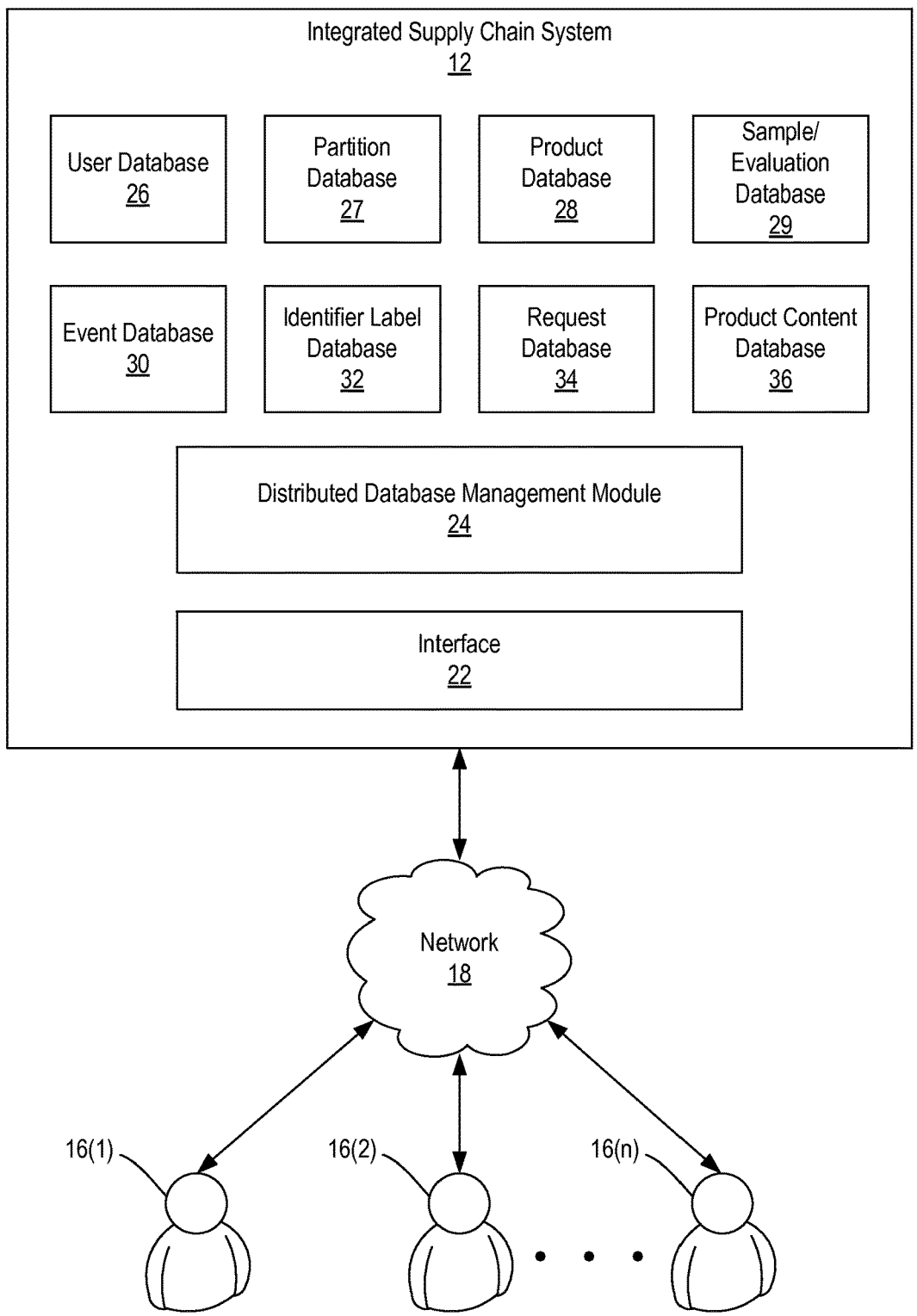
FIG. 2 is a block diagram illustrating the integrated supply chain system of FIG. 1 in greater detail.
Figure 3:
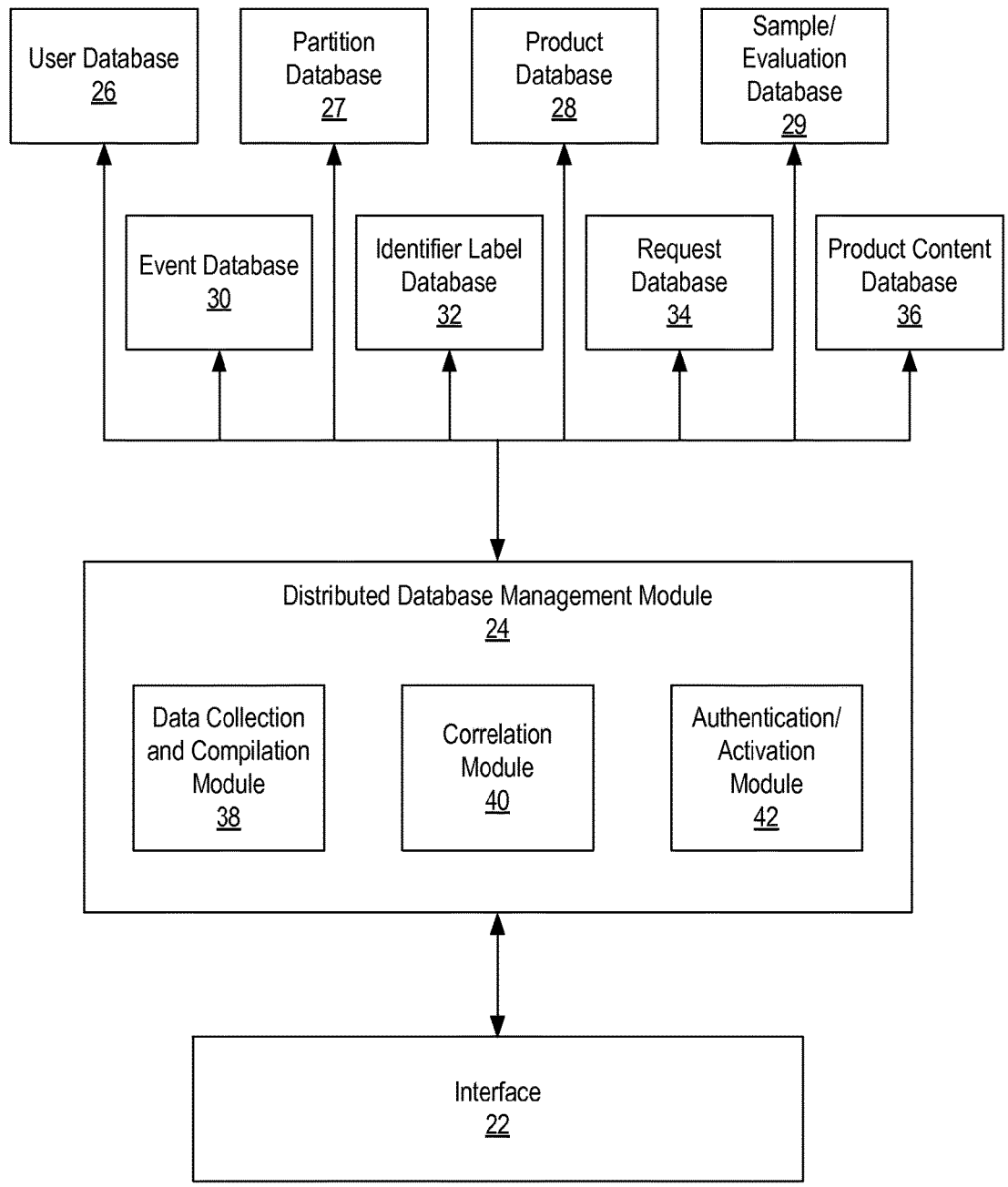
FIG. 3 is a block diagram illustrating the distributed database management module of FIG. 2 in greater detail.

FIG. 2 is a block diagram illustrating the integrated supply chain system 12 of FIG. 1 in greater detail. FIG. 3 is a block diagram illustrating the distributed database management module 24 of FIG. 2 in greater detail. As shown, the integrated supply chain system 12 may include an interface 22, a distributed database management module 24, and various databases for storing data related one or more users, one or more products in the supply chain, supply chain events, activities and processes associated with the product, specific requests associated with the product or supply chain events, activities and processes, and identifier labels associated, or to be associated with, one or more products. For example, the distributed database management module 24 may be configured to communicate and exchange data with a user database 26, a partition database 27, a product database 28, a sample/evaluation database 29, an event database 30, an identifier label database 32, a request database 34, and a product content database 36, each of which is described in greater detail herein.

As previously described, the interface 22 may generally allow a user 16 to access and share data with one or more components of the system 12. For example, upon accessing the system 12 on the cloud-based service 14, the interface 22 may be presented to the user on a user device, in which the user may navigate a dashboard or standard platform interface so as to access either traceability data related to a specific product or to access tools for supply chain management. For example, a consumer may be interested in knowing specific information about a product they either purchased or are interested in purchasing. In the instance of food, a consumer may want to know the origin of the food product, as well as who produced it, and how it was produced. Accordingly, a consumer may access the system 12 via a consumer device (e.g. computing device such as a smartphone, tablet, PC) so as to remotely view traceability information related to the product. In another example, a producer of a product may be interested in providing data related to a product they are about to process. Accordingly, the producer may access the system 12 via a user device so as to access supply management tools for allowing the input of such data to be associated with the product to be processed.

The exchange and handling of data between the integrated supply chain system 12 and the users 16, as well as the various databases (26-36) is generally managed by the distributed database management module 24. The distributed database management module 24 may generally operate according to a distributed data model, in which storage devices (e.g., databases 26-36) are not all attached to a common processing unit. For example, one or more of the databases 26-36 may be stored different computers or servers, located in the same physical location or may be dispersed over a network of interconnected computers. For example, some of the databases 26-36 may be distributed across multiple physical locations, such that they can reside on network servers on the Internet, on corporate intranets or extranets, or on other networks. Accordingly, by storing data across multiple computers, distributed databases can improve performance at end-user worksites by allowing transactions to be processed on many machines, instead of being limited to one.

The distributed database management module 24 is configured to manage the exchange of data between users 16 and the system 12 so as to provide traceability of a product as it moves through a supply chain as well as allow supply chain management. The distributed database management module 24 is further configured to manage access to data stored on the various databases 26-36.

For example, as an initial step, a user 16 attempting to gain access to the system 12 may be required to verify that they are registered with or otherwise allowed access to data provided by the system 12. The user database 26 may generally be used for the storage of a profile or account associated with a user. Accordingly, a user 16 may first be prompted to either login to an existing user profile or account stored in the user database 26 or to create a new account or profile. It should be noted, however, that an administrator associated with the system 12 (e.g. a third-party administrator) may have control over user access, determining who may have access and the level of access permitted. Additionally, the administrator may be able create a user profile or account or modify and existing profile or account. A user account or profile may generally include conventional input (e.g., user identity, user location or address, background information, role in supply chain, preferences, login credentials, etc.). It should further be noted that the distributed database management module 24 may further be configured to limit user access to certain data based on user credentials (e.g., role-based access). For example, a farmer may have limited access to the type of supply chain data versus the amount of access provided to a producer in the supply chain. It should be noted that in some instances, a user need not necessarily have an account or profile in order to access specific data. For example, a consumer may not have to be registered with the system 12 in order to access traceability information associated with a product they purchased or are interested in purchasing. Instead, the distributed database management module 24 may be configured to recognize the user's role (e.g., a consumer) and further limit access to traceability data.

User access may also be limited based on a specific group that the user is designated as belonging to (group-based access) or a specific jurisdiction under which the user is governed. For example, in some embodiments, the various components of the integrated supply chain system 12 may be operated by different independent agencies. The system 12 is configured to allow data resources comprising the integrated supply chain to be partitioned and distributed among different physical systems, yet to communicate and interoperate with one another via the distributed database management module 24. For example, as coffee is produced in at least 40 countries worldwide, such coffee-producing nations may consider information related to the production and trade by their citizens to be sovereign and subject to policies of their own design. Accordingly, the system of the present invention, using the capacities for distribution described herein, allows for the integrated supply chain to be segmented in such a way that an individual nation is able to store and operate a partition of the integrated supply chain independently.

In one exemplary embodiment, the system 12 may be embodied on a cloud-based service comprising multiple remote servers or external computing systems, each of which may be tied to, or otherwise associated with, a particular entity (e.g., country, nation, sovereign state, jurisdiction, enterprise, etc.). For sake of simplicity, the following description refers to the particular entity as being a nation, such that the system may include multiple remote servers, each of which is tied to a corresponding nation. For example, in the instance of coffee, a first remote server may be associated with Ethiopia, and a second remote server may be associated with Uganda, and so on. Each of the remote servers may be configured to communicate and exchange data with one another via a central server or computing system (e.g., distributed database management module 24). Accordingly, in one embodiment, a system consistent with the present disclosure may generally resemble a hybrid cloud which is a combination of private clouds with a public, or community cloud. For example, each remote server tied to a nation may serve as a private cloud, and each of the private clouds may be configured to communicate with a public, or community cloud, to allow for the exchange of data there between. In some embodiments, each remote server may be similarly configured as the integrated supply chain system 12 and include similar components (e.g., distributed database management module 24, one or more databases 26-36, etc.).

Each nation may have some form of control or management over their corresponding remote server, particularly control over the exchange or sharing of data from the remote server with other remote servers of the system 12. In an exemplary embodiment, a user accessing the system 12 may attempt to provide data (e.g., scan a barcode label to provide tracking information of a product). In this instance, the data may be tied to a specific nation and thus may be subject to the security policies and procedures outlined by the nation. Accordingly, during an exchange or attempted exchange of such data with the system 12, the system 12 (e.g., the distributed databased management module 24) may be configured to identify data type (e.g., identify the corresponding nation to which the data is associated) and further allocate or partition such data into the specific remote server associated with the nation to which the data belongs. Allocation of data into the remote servers may be based on specific access policies and procedures designed and controlled by each nation. The integrated supply chain system design allows the partitioned data to be fully functional and interoperable with all other partitions and components of the integrated supply chain. Furthermore, systems and methods of the present invention are configured to validate the data integrity of such allocated or partitioned data so as to provide credible assurances to external parties that the data maintained within the segmented partition has not been altered by accident or design. Toward the implementation of these features, data associated with any traceable unit may comprise data of a particular format designating the remote server (or partition) where part or all of the first data is to be maintained and accessed. The partition database 27 may include a list of all partitions registered with the integrated supply chain system 12, such that the distributed database management module 24 may refer to the partition database 27 to determine the authenticity of data for any given partition. For example, for each entry of a partition, a corresponding URL may be used in accessing or manipulating data from that partition. Access of such partitioned data may be granted based on the nation's specific security policies and procedures under which the remote server operates. For example, a user may have to be registered with a remote server, or otherwise be designated as authorized to obtain access to data on the remote server, in order to access partitioned data.

Accordingly, a coffee roaster in Seattle, upon receiving a shipment of coffee from Ethiopia, might request traceability data for each of the bags of coffee in that shipment upon arrival. The request would be initiated through an instance of the system serving the western United States, for example, and from there routed to an instance of the system situated in Ethiopia and maintaining a partitioned repository of data under the control of the Ethiopian government. The data relevant to the request may be routed directly to the requestor, or it may be passed to yet a third intermediate instance of the system where it may be validated by an independent third party prior to being delivered to the requestor.

Once a user is verified to be registered with the system, the user may have a variety of options to choose from. For example, a user may wish to input data into the system 12 related to the product they are handling at a current point along the supply chain. The data may include information related to the user, information related to the product, as well as information related to an event associated with the product. For example, the product may be a food product, such as coffee, and the user may be a coffee producer. The coffee producer may be responsible for a certain activity or process along the coffee supply chain. As will be described in greater detail herein, a coffee producer may be responsible for purchasing coffee cherry from a set of arbitrary farmers and processing the coffee cherry into parchment coffee. Upon generating parchment coffee and subsequently bagging the parchment coffee, the coffee producer will input data related to the bagged parchment coffee. More specifically, the producer will generally use an identifier label for the bagged parchment coffee for tracking the parchment coffee as it moves through the supply chain. The identifier label may include a unique identifier, such as a digital representation of a machine-readable label, such as text, graphics, an image, a linear barcode, a matrix barcode, or the like. Accordingly, the coffee producer may use a device equipped with necessary component to scan the identifier label and subsequently transmit the digital representation of the unique identifier to the system 12.

Upon receiving the digital representation, the distributed database management module 24 is configured to receive and/or compile data associated with the identifier label. For example, the distributed database management module 24 may include a data collection and compilation module 38. The data collection/compilation module 38 is configured to decode the digital representation, collect or identify the data associated therewith, and further compile the information into the respective databases 26-36. For example, the identifier label of a bag of parchment coffee may include information related to the coffee producer and/or farmers who produced coffee cherry, information related to the parchment coffee, information related to the supply chain event (e.g., processing of coffee cherry into parchment and bagging of parchment coffee). This information may be previously inputted into the system 12 by the coffee producer or administer, or other user, and pre-assigned to the specific identifier label used in tagging the bag of parchment coffee or the information may be inputted on-the-fly.

Accordingly, the product database 28 may generally be used for the storage of profiles associated with products, wherein each profile includes information related to an identity of a product or unit of product, characteristics of the product or unit of product, location of the product or unit of product, characteristics of the location. The characteristics of the product or unit of product may include, for example, physical attributes of the product or unit of product, origin of the product or unit of product, destination of the product or unit of product, and a combination thereof. Similarly, the characteristics of the location of the product or unit of product may include the operator of the location, overall capacity of the location, current capacity of the location, seasonality of the location, operational status of the location, current weather at the location, and a combination thereof.

As generally understood, quality assurance through sampling and evaluation is an important aspect of a traceability system in its functions of isolating and tracking contamination events and other quality issues. Accordingly, the sample and evaluation database 29 may generally be used for the storage of profiles associated with product samples and corresponding evaluations of such samples. A user may create samples of a product unit and submit such samples for evaluation at any point along the supply chain. In the instance of coffee, for example, coffee beans may be evaluated and graded during certain phases of production (e.g., parchment coffee, green coffee, roasted coffee, etc.). These samples and one or more evaluations may be registered in the sample/evaluation database 29 with links to the corresponding records in the user database 26, product database 28, and event database 30, according to the product unit sampled, the event, and the users performing the activities.

Furthermore, registered samples may be assigned unique identifiers, registered in the identifier label database 32 as a distinct class of traceable unit, and labeled accordingly. In the coffee supply chain, for example, samples of coffee are routinely passed among all members of the supply chain during production and transaction processes, including parchment samples, pre-shipment samples, reference samples, shipment samples, and arrival samples. Upon receiving a labeled sample, a member of the supply chain can immediately trace the sample to the individual units from which it was drawn and know their provenance and passage through the supply chain. Similarly, upon receiving a traceable product unit, a user may immediately access all samples and evaluations related to that unit, including all samples and evaluations drawn at any point in the supply chain, and also encompassing samples and evaluations pertaining to the peers, progeny, or progenitive units associated with that product. Furthermore, trading of any given unit of product may be based, at least in part, on the evaluation data. For example, the price for a unit may be dictated by the grading of a sample, as determined by the commodity exchange.

The event database 30 may generally be used for the storage of profiles associated with events tied to any given product or unit of product. An event may include, for example, any activity or process occurring along the supply chain by one or more members of the supply chain. For example, an event may include a transaction between members of the supply chain, such as the sale of coffee cherry from a farmer to a producer, or the sale of a cup of coffee from a retailer to a consumer. Accordingly, each event profile may include transactional data related to an exchange of the product between members of the supply chain, data related to a process or activity involving the product, or the like. The transactional data may include the identity of members of the supply chain associated with the exchange of the product, quantity of product exchanged, price paid for the product, date of the exchange of the product, and a combination thereof.

The identifier label database 32 may generally be used for the storage of profiles associated with identifier labels, wherein each profile may generally include information related to the identifier label, such as the identity of the identifier label, as well as all information to be associated with or assigned to the identifier label (such information including user information, product information, and event information from databases 26-30). Accordingly, the distributed database management module 24 is configured to manage the correlation of data between databases 26-36 so as to provide associations there between for tracking purposes. For example, when an identifier label is scanned and the digital representation is transmitted to the system 12, data associated with the identifier label is retrieved by the distributed database management module 24 and compiled for access by a user. Furthermore, two or more identifier labels may be associated with one another, wherein data corresponding to each of the identifier labels may be correlated so as to provide traceability of the product, as will be described in greater detail herein. More specifically, as shown in FIG. 3, the distributed database management module 24 further includes a correlation module 40 configured to correlate two different sets of data with one another. The correlation module 40 may include custom, proprietary, known and/or after-developed statistical analysis code (or instruction sets), hardware, and/or firmware that are generally well-defined and operable to receive two or more sets of data and identify, at least to a certain extent, a level of correlation and thereby associate the sets of data with one another based on the level of correlation.

As referred to herein, correlation analysis may generally refer to the associating of two sets of variables (e.g., two different barcode tags) with each other. In the instance of a supply chain, correlation analysis may include establishing connections between two sets of variables (between at least two events occurring along the supply chain). Exemplary techniques for performing correlations are described for example in Hotelling, H., "Relations Between Two Sets of Variates", Biometrika, 28 (3-4): 321-377, 1936; Hsu et al., "A spectral algorithm for learning Hidden Markov Models", Journal of Computer and System Sciences, 78 (5): 1460, 2012; Härdie et al., "Canonical Correlation Analysis", Applied Multivariate Statistical Analysis, pp. 321-330, 2007, the content of each of which is incorporated by reference herein in its entirety. Exemplary correlation analysis systems and methods are discussed in greater detail in Techniques for Reconstructing Supply Chain Networks Using Pair-Wise Correlation Analysis, U.S. Pat. No. 7,433,857 to Rice et al., the content of each of which is incorporated by reference herein in its entirety.

In some embodiments, the system 12 uses network modeling techniques to model relationships between associated sets of data and further uses network traversal techniques to retrieve complex patterns of associated data quickly and efficiently. For example, the correlation of sets of data with one another may be based on direct observation. For example, when parchment coffee undergoes a milling process, individual units of parchment coffee may be scanned (e.g., scanning of barcoded identifier label) as they are loaded into the mill, thus creating an aggregate unit, or "mill lot", with all contributed units associated with one another based on the scanning event. When the resultant green coffee is re-bagged, the units are directly linked to the green coffee lot and the green lot is directly linked to the "mill lot."

Correlation and statistical algorithms may further be relied upon as a means of facilitating handling of units during certain processes or activities along the supply chain, such as warehouse handling. For example, when a lot is received at a warehouse, rather than scanning the identifier label of every unit individually as it is loaded into the mill, the warehouse operator seeks to cut costs by scanning a sample unit of the total set of units. The system 12 is configured to utilize statistical analysis algorithms to determine the probability that the sample accurately reflects the identity of the lot and more importantly, provide a level of confidence that the lot is intact and all the units that have not been scanned will belong to the same identified lot.

The system 12 of the present invention is further configured to receive requests from users 16 for the issuance and/or activation of identifier labels. For example, a user may wish to have identifier labels for tagging a product or unit of product at a given event along the supply chain. In some instances, a user may be remotely located and lack the systems or technology for physically implementing the identifier labels or lack the funds necessary for such systems. In other instances, a user may have a specialty product in which the authenticity of the product is strictly enforced. The requests may generally include data related to the requesting user, the product to be tagged, and the event requiring tagging (e.g., identity of requestor, identity of the product, type of event, etc.). Accordingly, the system 12 is configured to receive and store such requests in the request database 34, at which point the distributed database management module 24 is configured to review the requests and, based on authentication procedures, issue and/or authorize use of requested identifier labels. For example, as shown in FIG. 3, the distributed database management module 24 includes an authentication/activation module 42 configured to verify the authenticity of a request based on a comparison between data associated with the request and previously stored or known data. For example, a requestor's identity may be used as a means of verifying the authenticity of a request for the issuance of identifier labels, where the authentication/activation module 42 may compare request data with user profiles of the user database 26. It should be noted that other forms of data may be used for the verification step, and is not limited to a requesting party's identity. For example, as will be described in greater detail herein, specific parameters may be tied or otherwise associated with requested identifier labels. As part of the authentication/activation step, the requester must attempt activation of the identifier labels within the specific parameters. For example, a set of issued identifier labels may have a specific time frame associated with them, such as an expiration date, or may be tied to a particular geographic location. Accordingly, in order to activate the identifier labels, the system may require that the requestor attempt activation within the time frame and/or within the specific geographic location. The authentication/activation module 42 may include custom, proprietary, known and/or after-developed statistical analysis code (or instruction sets), hardware, and/or firmware that are generally well-defined and operable to receive two or more sets of data and identify, at least to a certain extent, a level of trust of the request. Accordingly, the system 12 is configured to act as a certifying third-party, thereby providing a sense of security so as to ensure that the use of identifier labels is strictly governed and further ensuring the authenticity of a product.

Another form of a request may be received from a retailer or seller who wishes to provide product traceability information, as well as other types of information, to a consumer who purchased or is interested in purchasing the product. More specifically, a seller may wish to provide dynamic content to a consumer at the point of sale or delivery, wherein such dynamic content may be specific to details about the specific product sold, the circumstances of the transaction, or the identity of the consumer. The dynamic content may be stored in the product content database 36, wherein the seller may have access to such database and can assign or modify the content to be associated with the product sold or to be sold, which is discussed in greater detail herein.

As previously described, the integrated supply chain management system 12 is integrated in the sense that multiple users are able to contribute and draw information from the system so as to improve visibility of traceability data, even in the event that users are not part of the same organization or business entity. In some embodiments, access to supply chain data of a given product (e.g., product traceability data, identity of users associated with product supply chain, etc.) may be controlled based on established relationships or connections between one or more users. For example, users in a supply chain may be part of a group based on or more common characteristics that they share, such as, their role in the supply chain, their relationship with other user's in the supply chain, their assigned level of access to data, as well as specific designation into one or more groups as decided by an administrator, or other user, having authority to define a user's level of access or assign a user to a specific group. Accordingly, the system 12 may be configured to allow a user access to specific sets data based on the one or more groups that the user is a member of. For example, the system 12 may include one or more access plans for a specific group, wherein an access plan generally includes a set of data accessible to a user associated with the group to which the access plan corresponds.

The group-based access may be similar to those implemented in social networking platforms. For example, users, such as producers, may be part of a group based on their role in a supply chain. Accordingly, the system 12 may allow producers in that group to access a specific set of data based on their membership to the group. The specific set of data may include, for example, the profile of other producers within that group, including the identity of the producer, the producer's location, the producer's production history, including current supply chain events as well as prior supply chain events, for any given product. Accordingly, the system 12 may allow a user to view statistical information of another user. In addition to providing access to non-critical data (e.g., statistical data and the like), the system 12 may assign access plans to users of a group having authority to view and/or modify confidential or critical data, such as transactional data (e.g., order requests, assignment of orders, etc.). For example, a select few users may have the authority to manipulate supply chain data so as to control events and activities tied to the supply chain of a product. For example, specific users in a supply chain (e.g., producer, exporter, retailer/buyer, etc.) may have the authority to dictate certain aspects of the supply chain, such as transactional aspects of a product in the supply chain (e.g., purchase price, quantity, timing of delivery or sale, etc.). Such users may be assigned membership into an exclusive group. The system 12 is configured to provide an access plan directed to such an exclusive group, wherein access to the previously described critical data can be limited to the exclusive group, such that only those members have access.

It should be noted that groups may be created via supply chain management tools provided by the system 12, such that an administrator, or other user having authority to do so, can assign users to a particular group. The access plans can further be created and assigned to any given group via the supply chain management tools provided by the system 12. Accordingly, the integrated supply chain management system 12 is configured to allow users to contribute to and draw from a shared flow of data, while in a controlled and regulated manner so as to ensure security of the data.

It should further be noted that the integrated supply chain system 12 may be configured, in certain embodiments, to provide various levels of tracing and tracking services commensurate with different levels of costs, depending on the degree of "credibility" any given transaction requires. For example, some products require a high level of attention during movement through the supply chain so as to ensure authenticity of the product from point of origin to the final consumer. Some products are of such a nature that their handling must be closely monitored for purposes of safety and precaution (e.g., food products). The different levels of service may be associated with different levels of certification. For example, in one embodiment, the highest level of service (e.g., "gold standard") may include a physical agent being sent to a given location where a process or event is occurring such that the agent may supervise that event (e.g., coffee going through the milling process). For a mid-level service (e.g., "silver standard"), a physical agent may not be sent out, but is on standby, which may cause of a degree of trust to be involved. For the lowest level of service (e.g., "bronze standard"), data may be provided with no separate certification. The different levels of service may include additional requirements that certain members of the supply chain must comply with, such as, for example, additional tracking processes (e.g., capturing images of the product at points along the supply chain or during an exchange of the product from one member to another member of the supply chain).

The system 12 may generally be aware of the level of service for any given product. Accordingly, as the system 12 is tracking products, issuing or authorizing identifier labels, and the like, the system is configured to further integrate the level of service certification standards. For example, the event database 30 may store a sign-in event associated with the GPS coordinates of a physical inspector at the mill site as part of a milling event. Another example may include storage of image data (e.g., timestamped and/or geo-stamped) at an event. For example, exporters may be required to photograph identifier labels on a product (e.g., bags of green coffee beans), including close-ups of the labels, upon loading a container for delivery. The images may then be uploaded to the event database 30. Accordingly, in the event that an importer receiving the shipment complains the wrong coffee was delivered or wasn't labeled, the image record is available to verify conditions at point of departure. As another example, a "circle of trust" model may be implemented among farming communities where independent producers can build a credibility score based on a set of factors. The distributed database management module 24 may include algorithms for determining the level of credibility of the traceability data for a given product based on a variety of criteria.

Figure 4A:
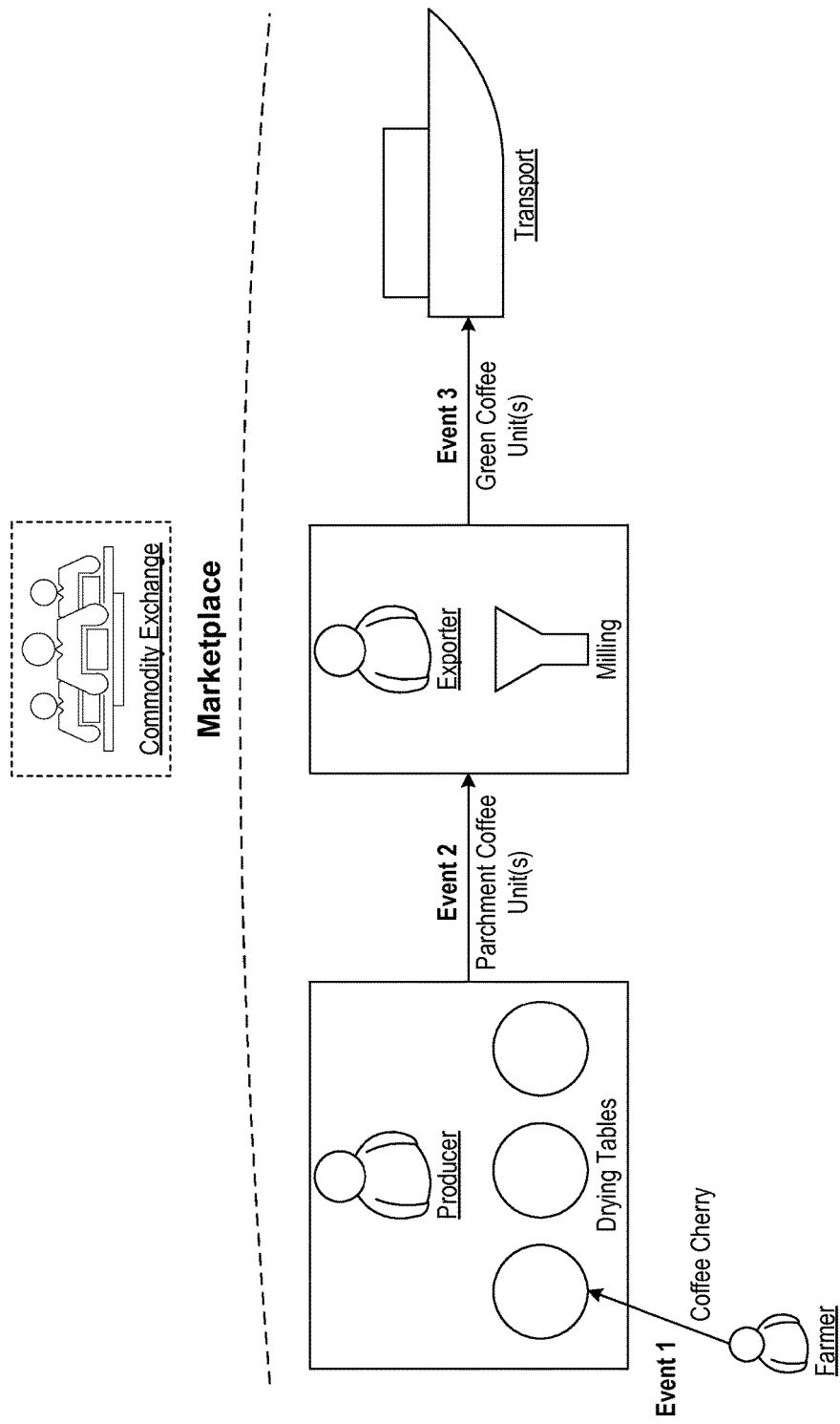
FIGS. 4A and 4B illustrate a continuous flowchart of an exemplary supply chain for coffee.
Figure 4B:
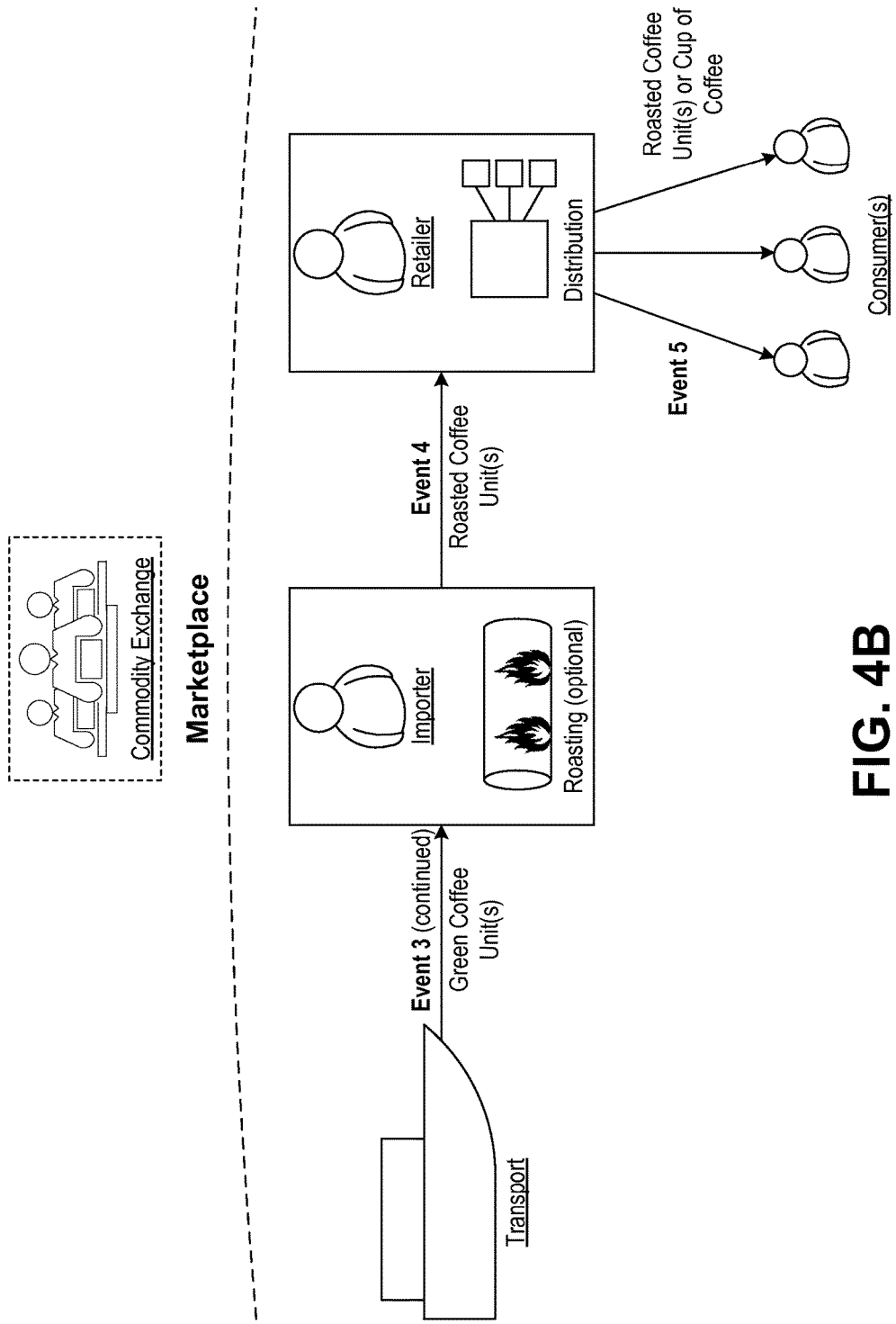

A particular exemplary embodiment of systems and methods of the invention is described in FIGS. 4A and 4B, which illustrate a continuous flowchart of an exemplary supply chain for coffee. For coffee, the supply chain is often complex, and varies in different countries. The various members of the supply chain may include, for example, the farmers or growers, intermediaries, such as producers and exporters who perform much of the processing, as well as importers, suppliers, transporters, retailers, and the like, who may be involved in one or more events required to bring a coffee bean from its raw state through to a finished state to be delivered to the consumer or requesting customer. As previously described, coffee is generally considered a traded commodity in most countries. Accordingly, another entity that may play a role in the coffee supply chain process is a commodity exchange, which generally facilitates trade by providing a fluid and stable market for food or other products, as will be described in greater detail herein. Referring to FIG. 4A, upon harvesting coffee cherries, farmers will generally sell their harvest to a producer or other intermediary (Event 1). Intermediaries, such as producers, processors, exporters, and the like, may buy coffee at any stage between coffee cherries and green beans and they may further perform some of the primary processing, or they may collect together sufficient quantities of coffee from many individual farmers to transport or sell to a processor, another intermediary, or to a dealer. There may be as many as five intermediary links in the chain.

For sake of simplicity, and ease of description, FIG. 4A illustrates sale of coffee cherries from a farmer to a producer. The farmer may generally work on a very small plot of land of just one or two hectares, for example. Many farmers may undertake primary processing (drying or hulling) themselves. However, for the most part, intermediaries, such as the producer and exporter, will perform much of the processing. The producer may begin the processing of the coffee cherries, either by a wet process or a dry process, so as to obtain a parchment coffee product. In the wet process, the fruit covering the seeds/beans is removed before they are dried. Coffee processed by the wet method is called wet processed or washed coffee. After the washing process, the beans are dried in the sun or by machine. When dried in the sun, coffee is most often spread out in rows on large patios where it needs to be raked every six hours to promote even drying and prevent the growth of mildew. Some coffee is dried on large raised tables where the coffee is turned by hand. The drying operation is an important stage of the process, since it affects the final quality of the green coffee.

Upon drying the cherries (now parchment coffee), the producer may store the parchment coffee in bulk until an order is placed in which units of parchment coffee may be transferred to an exporter (Event 2). The units of parchment coffee may be sent to a mill where hulling, sorting, grading, and bagging takes place to create units of green coffee. The units of green coffee may be transported in jute bags, for example. The units of green coffee are then transported to an importer, for example (Event 3). The importer may also be responsible for roasting the green coffee. However, it should be noted that green coffee may travel through the remainder of the supply chain to be sold to a consumer for roasting at home. The units of green coffee may alternatively be provided to a dealer or broker who is responsible for supplying the green coffee to roasters in the right quantities, at the right time, at a price acceptable to buyer and seller. The importer may then provide roasted coffee to the retailer (e.g. the seller of the coffee product) (Event 4). The roasted coffee may be sold to the retailers in bulk, at which point the retailers than distribute the bulk quantity into smaller consumer-size portions for sale at a consumer level. Alternatively, the roasted coffee may be provided to the retailers in smaller consumer-size portions for sale at a consumer level. Retailers may include, for example, large supermarkets, independent coffee retailers, hotel and catering organizations, and the like. The retailers may then sell either units of roasted coffee (e.g., 12 ounce bags of roasted coffee beans) or sell cups of brewed coffee to consumers (Event 5).

The commodity exchange generally functions by aggregating similar units of a product into well-defined categories, allowing units within each category to be traded as equivalents (e.g., commodities). A single market price governs transactions of a classified product at a given point in time. Producers and traders may benefit from a single, known price they can access for a given product. In the present example, coffee may generally be traded through the commodity exchange, which generally acts as a marketplace that serves all market actors, from the farmers to traders to processors to exporters to consumers. Most of the coffee in Ethiopia, for example, is traded through the Ethiopia Commodity Exchange (ECX) for example, with units assigned to approximately 100 classifications based on quality and geographic region of origin. A commodity exchange may be important and relied upon by members of the market due to its ability to disseminate data to all market actors, through clearly defined rules of trading, warehousing, payments and delivery and business conduct, and through an internal dispute settlement mechanism. The commodity exchange may provide market integrity at different levels, including the integrity of the product itself, the integrity of the transaction, and the integrity of the actors involved.

Despite its benefits, the commodity exchange may present a challenge for traceability. The principle of equivalence underlying the market requires the removal of certain information, such as the identity of the producer. The systems and methods of the present invention allow a product to be traded through a commodity exchange market structure without compromising this principle of equivalence, so long as the traceability up to the point of trade is retained. The information may be hidden, such that a buyer trading in an exchange is unable to select individual units from a known producer at the time of a transaction. However, the identifier labels (e.g., barcoded tags) associated with each unit of coffee, for example, may pass through the market, and allow full traceability to the supplier(s) of the traded units to be made available after the transaction is complete.

The following flow diagrams of FIGS. 5-9 illustrate various embodiments of methods consistent with the present invention and are generally directed to coffee products. It should be noted, however, that the following methods described herein are applicable to various products, goods, services, and the like, are not limited to coffee.

Figure 5:
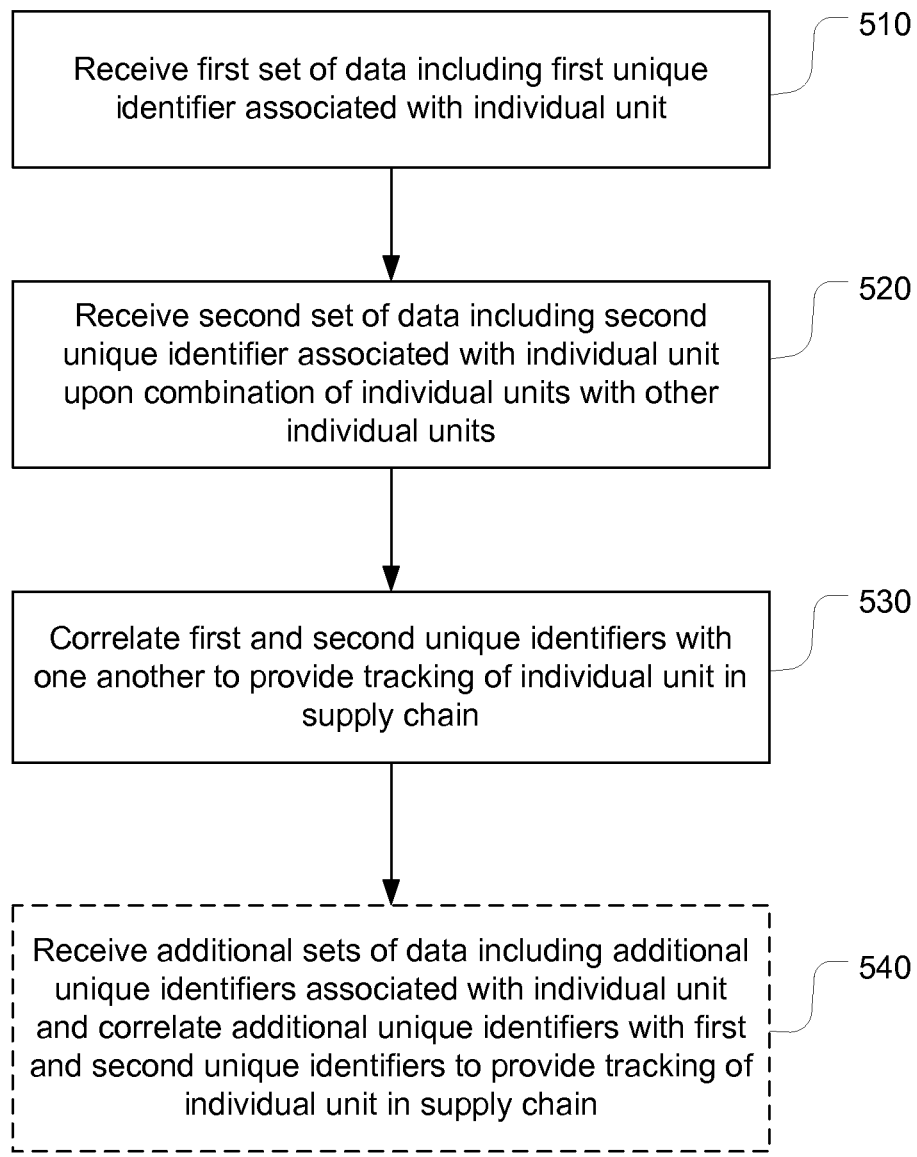
FIG. 5 is a flow diagram illustrating one embodiment of a method for tracking an individual unit within a supply chain.

Aspects of the invention are able to track individual units even when those individual units are split or combined with other individual units. FIG. 5 is a flow diagram illustrating one embodiment of a method 500 for tracking an individual unit within a supply chain, particularly accounting for mixing of the individual unit with other individual units as it moves through the supply chain. The method 500 includes receiving a first set of data that includes a first unique identifier that is associated with an individual unit (operation 510). The method 500 further includes receiving a set of data including a second unique identifier associated with the individual unit once the individual unit becomes combined with other individual units as the individual unit is moving within the supply chain (operation 520).

As will be appreciated in the following description, method 500 is applicable in a coffee supply chain, particularly where there are three key transitions where blending of a coffee product occurs. In coffee, particularly of African origin, the first key transition occurs between farmers and producers of the flowchart of FIG. 4A. The system 12 is configured to associate a set of input units of coffee cherry purchased from an arbitrary set of farmers at the primary producer level (the wet mill) (Event 1) to a produced set of output units (parchment coffee) based, at least in part, on transaction date and location. The second key transition occurs between producers and exporters. At the point of export preparation (dry milling), the system 12 is configured to associate an arbitrary set of input units (parchment coffee) to a set of output units (green coffee). The third key transition occurs between at least a distributor (e.g., retailer) and consumer of the flow chart of FIG. 4B. At the retail distributor (e.g. coffee roaster), the system 12 is configured to associate an arbitrary set of input units (green coffee) to a set of output units of finished goods (e.g. 12-oz. bags of roasted coffee). The association of input units to output units in each of the three transitions may be accomplished in one of two ways. In one embodiment, each output unit may be marked with an identical barcode label linking them all to a single batch. In the other embodiment, each output unit of finished goods may be marked with a unique barcode label, opening a whole set of possibilities.

In the instance of coffee, for example, and referring to the flowchart of FIGS. 4A and 4B, individual unit may relate to a unit of parchment coffee produced by the producer. More specifically, farmers sold coffee cherries to the producer at Event 1. It should be noted that the following method 500 may also apply to green coffee or roasted coffee, as well, and is not limited solely to the tracking of parchment coffee. In the systems and methods of the present invention, each farmer may have an ID card or other form of identification. The third-party certifier (administrator) of the integrated supply chain system 12 may issue the ID card to any given farmer, wherein the farmer's information (e.g., identity, address, farm location, farm profile, etc.) may be stored in the user database 26, such that the farmer can be a registered user and have some form of access to the system 12. Upon sale (Event 1) of the coffee cherries, the farmers ID card may be scanned (e.g., ID card may include a machine-readable label), at which point, data associated with the ID card, as well as the event (sale of coffee cherries) may be stored in the respective databases 26-36. Any number of user devices may be used in scanning and transmitting the data associated with the ID card. For example, a farmer may utilize their smartphone or other mobile computing device having a barcode scanning application for capturing a barcode label on their ID card and decoding the digital representation and further transmitting the data associated therewith to the system 12 via the network 18.

Upon processing and producing units of parchment coffee (generally in jute bags), the producer may affixed identifier labels to each bag of parchment coffee. Accordingly, each bag, or unit, of parchment coffee includes a first unique identifier associated therewith, such as, for example, a digital representation of a machine-readable barcode label. The producer may then scan the identifier label, at which point a first set of data may be received by the system 12, specifically the distributed database management module 24. During movement within the supply chain, such as movement from a producer to an exporter, that individual unit of parchment coffee may become blended with other units of parchment coffee in preparation for the milling process, so as to create a blend of green coffee beans to be milled. Accordingly, the distributor may have identifier label associated with the blend of green coffee having a second unique identifier. The exporter may then scan the identifier label on the blend of green coffee, at which point a second set of data may be received by the distributed database management module 24.

In one aspect, each of the first and second sets of data may include, but are not limited to, identity of the individual unit of parchment coffee, location of the individual unit of parchment coffee, characteristics of the location, characteristics of the individual unit of parchment coffee, transactional data related to an exchange of the individual unit of parchment coffee between members of the supply chain, and a combination of at least two thereof. The characteristics of the individual unit of parchment coffee may include, but are not limited to, physical attributes, such as grading and classification, of the parchment coffee, origination of the parchment coffee, destination of the parchment coffee, origin of the individual unit of parchment coffee, destination of the individual unit of parchment coffee, and a combination thereof. Further still, the characteristics of the location of the individual unit of parchment coffee may include, but are not limited to, operator of the location, overall capacity of the location, current capacity of the location, seasonality of the location, operational status of the location, current weather at the location, and a combination of at least two thereof. The transactional data may include, but is not limited to, identity of members of the supply chain associated with the exchange of the individual unit of parchment coffee, quantity of individual unit of parchment coffee exchanged, price paid for the individual unit of parchment coffee, date of the exchange of the individual unit of parchment coffee, quantity of blended set of coffee exchanged, price paid for the blended set of coffee, date of the exchange of the blended set of coffee, and a combination of at least two thereof.

The method 500 further includes correlating the first and second unique identifiers with one another so that the individual unit can be tracked within the supply chain (operation 530). For example, the first and second unique identifiers associated with the identifier labels on the bag of parchment coffee and blended bag of green coffee, respectively, are correlated with one another, via the correlation module 40, so that the individual unit of parchment coffee can be tracked within the supply chain while accounting to the exchange of hands and the blending of the individual unit of parchment coffee with other units. The method 500 further includes receiving additional sets of data including additional unique identifiers associated with the individual unit as it moves through the supply chain and correlating the additional unique identifiers with the first and second unique identifiers to provide further tracking of the individual unit as it moves in the supply chain (operation 540). As generally understood, and illustrated in FIGS. 4A and 4B, the blended bag of green coffee may further be combined with other blended bags of green coffee during roasting and/or may be further separated into smaller units (Events 4 and 5). Accordingly, the systems and methods of the invention are able to provide comprehensive traceability of multiple individual units of a product as they move through the supply chain, accounting for mixing of any given individual unit with other individual units, as well as further mixing and/or separation during supply chain movement, thereby allowing the origin of any given individual unit to be traced, despite being mixed and/or separated.

Figure 6:
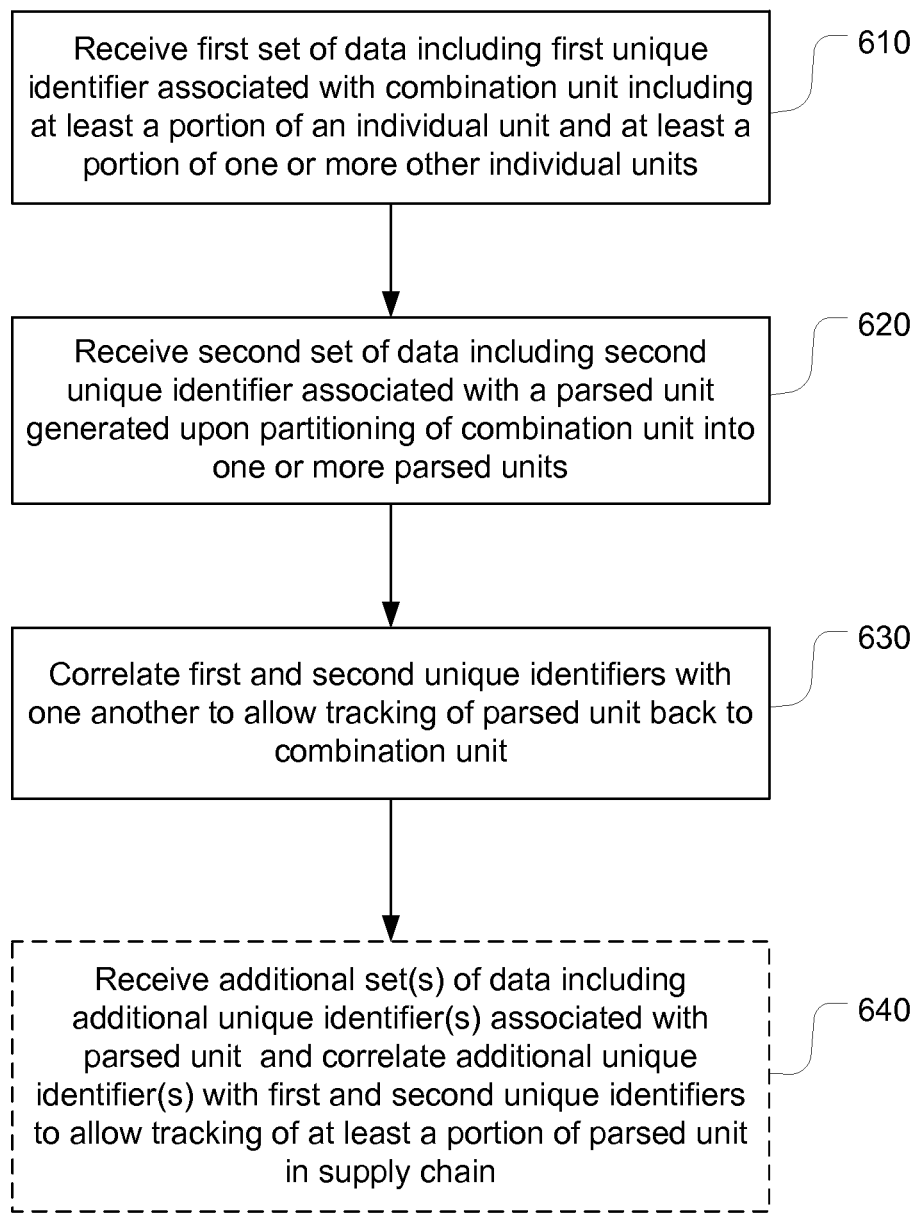
FIG. 6 is a flow diagram illustrating another embodiment of a method for tracking an individual unit within a supply chain.

FIG. 6 is a flow diagram illustrating another embodiment of a method 600 for tracking an individual unit within a supply chain, particularly accounting for partitioning or splitting of that unit as it moves through the supply chain. The method 600 includes receiving a first set of data that includes a first unique identifier that is associated with a combination unit (operation 610). The method 600 further includes receiving a set of data including a second unique identifier associated with a parsed unit generated from the partitioning of the combination unit (operation 620).

Similar to the example provided for FIG. 5, the following example refers to a coffee product. As an example, a batch of green coffee may include at least a portion of an individual unit of green coffee, as well as portions of other individual units of green coffee. It should be noted that the following method 600 may also apply to parchment coffee or roasted coffee, as well, and is not limited solely to the tracking of green coffee. Each of the individual units of green coffee may be different from one another, such as having different origins, different identities, different harvesting dates, etc. Accordingly, the batch of green coffee may be embodied as a blend of different green coffee parts.

That batch of green coffee includes a first unique identifier associated therewith, such as, for example, a digital representation of a machine-readable label. The first unique identifier may include, but is not limited to, text, graphics, one or more images, a linear barcode, a matrix barcode (e.g., QR code), or the like. Accordingly, in one embodiment, the batch of coffee may be marked, or otherwise be associated, with an identifier label, such as a barcode label. During movement within the supply chain, such as movement from an exporter to an importer, that batch of green coffee may be partitioned into smaller, more manageable portions, such as the typical jute or sisal (or burlap) sacks of green coffee (Event 3). Accordingly, a second unique identifier will become associated with an individual sack of green coffee upon partitioning of the batch into multiple sacks. For example, an exporter may affix identifier labels with each bag of green coffee, which was partitioned from the larger batch of green coffee. Accordingly, the system 12 is configured to receive a first set of data including the first unique identifier associated with the batch of green coffee and a second set of data including the second unique identifier that becomes associated with a sack of green coffee when the batch of green coffee is partitioned (Event 3).

In one aspect, the first set of data may include, but is not limited to, identity of the batch of green coffee, identity of one or more individual units of green coffee within the batch of green coffee, location of the batch of green coffee and location of one or more of the individual units of green coffee within the batch of green coffee, characteristics of the locations, characteristics of one or more individual units of green coffee, transactional data related to an exchange of the batch of green coffee between members of the supply chain, and a combination thereof. The characteristics of an individual unit of green coffee may include, but are not limited to, physical attributes, such as grading and classification, of the green coffee, origination of the green coffee, destination of the green coffee. Further still, the characteristics of the location of the batch of green coffee or individual unit of green coffee may include, but are not limited to, operator of the location, overall capacity of the location, current capacity of the location, seasonality of the location, operational status of the location, current weather at the location, and a combination of at least two thereof. The transactional data may include, but is not limited to, identity of members of the supply chain associated with the exchange of the batch of green coffee, quantity of the batch of green coffee exchanged, price paid for the batch of green coffee, date of the exchange of the batch of green coffee, and a combination thereof.

The second set of data may include, but is not limited to, identity of the sack of green coffee, location of the sack of green coffee, characteristics of the location, characteristics of the sack of green coffee, transactional data related to an exchange of the sack of green coffee between members of the supply chain, and a combination thereof. The characteristics of the location of the sack of green coffee may include, but are not limited to, operator of the location, overall capacity of the location, current capacity of the location, seasonality of the location, operational status of the location, current weather at the location, and a combination thereof. The transactional data may include, but is not limited to, identity of members of the supply chain associated with the exchange of the sack of green coffee, quantity of the sack of green coffee exchanged, price paid for the sack of green coffee, date of the exchange of the sack of green coffee, and a combination thereof.

The method 600 further includes correlating the first and second unique identifiers with one another so that the parsed unit (e.g., sack of green coffee) unit can be traced back to the combination unit (e.g., batch of green coffee) (operation 630). For example, the first and second unique identifiers associated with the identifier labels on the batch of green coffee and the bag of green coffee, respectively, are correlated with one another, via the correlation module 40, so that the bag of green coffee can be traced back to the batch of green coffee while accounting to the exchange of hands and the splitting of the batch of green coffee. The method 600 further includes receiving additional sets of data including additional unique identifiers associated with the parsed unit as it moves through the supply chain and correlating the additional unique identifiers with the first and second unique identifiers to provide further tracking of the parsed unit as it moves in the supply chain (operation 640). Accordingly, the systems and methods of the invention are able to provide comprehensive traceability of multiple individual units of a product as they move through the supply chain, accounting for mixing of any given individual unit with other individual units, as well as further mixing and/or separation during supply chain movement, thereby allowing the origin of any given individual unit to be traced, despite being mixed and/or separated.

The foregoing has been a discussion of how an individual unit can be traced through a supply chain from its origins to the product that is provided to a consumer using systems and methods of the invention. Certain specific aspects of the invention are now discussed below.

Figure 7:
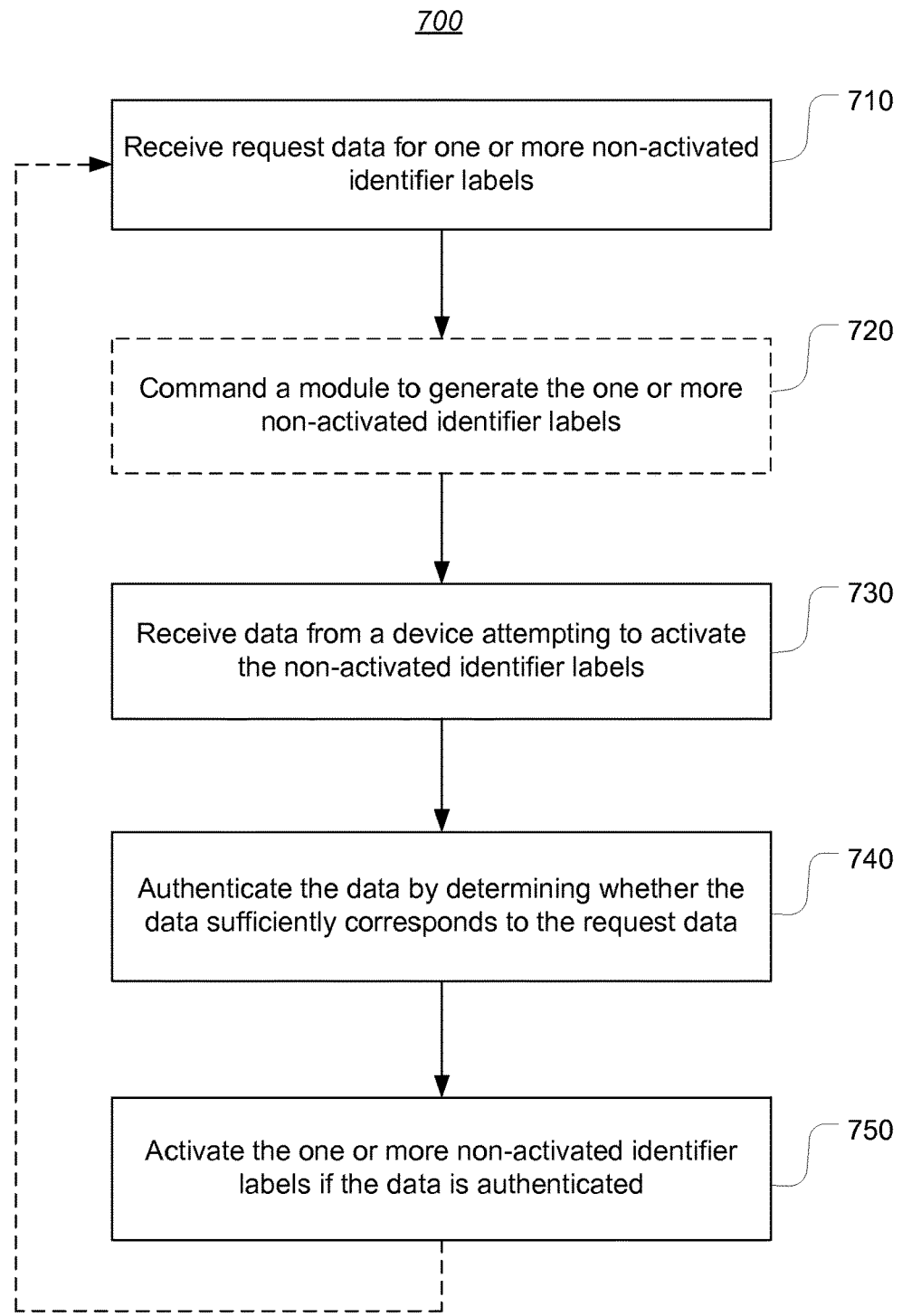
FIG. 7 is a flow diagram illustrating one embodiment of a method for generating and activating one or more identifier labels for use with tracking product(s) in a supply chain.

In certain aspects, the invention involves supplying a user with identifier labels, such as barcoded tags, associated with information residing on the integrated supply chain management system 12, embodied on the cloud-based service 14, and further activating the labels through a verification process driven by the user. FIG. 7 is a flow diagram illustrating one embodiment of a method 700 for generating and activating one or more identifier labels for use with tracking product(s) in a supply chain. The method includes receiving request data for one or more non-activated identifier labels (operation 710). As previously described, a user 16 may need to have identifier labels for tagging a product or unit of product at a given event along the supply chain. In some instances, a user may be remotely located and lack the systems or technology for physically implementing the identifier labels or lack the funds necessary for such systems. The user may simply utilize the supply chain management tools provided in the interface 22 of the integrated supply chain system 12 to initiate a request for identifier labels. For example, in the instance of a coffee supply chain, as illustrated in FIGS. 4A and 4B, the farmer may be the requestor (e.g., user requesting identifier labels).

The request data may include, but is not limited to, the identity of the requestor, characteristics of the requestor, location of the requestor, characteristics of the location of the requestor, data associated with a unit or product to which the one or more identifier labels is to be associated, and a combination thereof. The characteristics of the requestor may include, background information, qualifications or certifications, historical information associated with one or more prior requests, and a combination thereof. The data associated with the unit or product includes, for example, an identity of the unit, characteristics of the unit, location of the unit, characteristics of location of the unit, and a combination thereof. The characteristics of the product or unit may include physical attributes of the unit, origin of the unit, destination of the unit, and a combination thereof. The characteristics of the location of the product or unit may include, but are not limited to, an operator of the location, overall capacity of the location, current capacity of the location, seasonality of the location, operational status of the location, current weather at the location, and a combination thereof. The characteristics of the location of the requestor may include the operator of the location, overall capacity of the location, current capacity of the location, seasonality of the location, operational status of the location, current weather at the location, and a combination thereof.

Accordingly, when making a request, a user may be prompted to provide a variety of information, both for the purposes of clarity and transparency with what the identifier labels are to be associated with and how the identifier labels are to be used.

The method 700 may further include commanding a module to generate the one or more non-activated identifier labels (operation 720). It should be noted that this step may be optional. As generally understood, the module may include a peripheral device, such as a printer, configured to generate the identifier labels. The identifier labels may include, for example, a machine-readable label including, but not limited to, text, graphics, an image, a linear barcode, a matrix barcode, an RFID element, and a combination thereof. Accordingly, the module may include a barcode printer. The non-activated labels may then be provided to the requestor (e.g., user requesting the identifier labels). In a non-activated state, the data associated with the labels or to be associated with the labels is unavailable to the user, as determined by the administrator. In other words, the system 12 is configured to prevent access to any information or data to be associated or assigned with the non-activated identifier labels.

It should be noted that in some embodiments, a user may already have one or more identifier labels and may merely want to activate, or otherwise make use of, the labels already in their possession. Accordingly, the one or more identifier labels need not be created, as previously indicated in operation 720. Instead, as part of operation 710, and by way of interface 22, a requesting user may simply provide data, including data they wish to be associated with the identifier labels, as well as data to be used as part of the authentication process.

The method 700 further includes receiving data from a device attempting to activate the non-activated identifier labels (operation 730). In this instance, a user who has since received the non-activated identifier labels may now be attempting to use the labels for tracking of an associated product. The user may attempt to access data on the system 12 that is to be associated with the non-activated identifier labels. For example, the user may attempt to scan an identifier label with a user device. Alternatively, the user may simply request that the non-activated identifier labels be activated via the system interface 22. In any event, the system 12 is configured to recognize and attempt to use a non-activated identifier label. The data from the device may include, for example, the identity of the requestor, characteristics of the requestor, location of the requestor, characteristics of the location of the requestor, identity of the unit, characteristics of the unit, location of the unit, characteristics of location of the unit, and a combination thereof.

The method 700 further includes authenticating the data received from the device by determining whether the data sufficiently corresponds to the request data (operation 740). As previously described, the distributed database management module 24 is configured to review the requests and, based on authentication procedures, issue and/or authorize use of requested identifier labels. More specifically, the authentication/activation module 42 is configured to verify the authenticity of the attempted use, or request for use, of the non-activated identifier labels by comparing the request data with the data received from the device. As previously described, a user device may include any computing device configured to store and access data, and/or to execute software and related applications consistent with the present disclosure. Accordingly, a user may use a computer in an attempt to activate the one or more identifier labels, wherein the attempt may include accessing the supply chain management tools via the interface 22 and simply requesting activation of the identifier labels that may already be registered with the system 12. As part of the attempted activation, a user may provide their identity, for example, along with other credentials that may be used for authentication and ensuring the user is who they claim to be. For example, a requestor's identity may be used as a means of verifying the authenticity of a request for the activation of identifier labels, where the authentication/activation module 42 may compare data received from a user's device (data associated with the attempted activation) with user profiles of the user database 26 in which the identity of the requestor initially requesting the one or more identifier labels is stored.

It should be noted that other forms of data may be used for the authentication step in addition, or alternatively, to a requesting party's identity. In some embodiments, specific parameters may be tied to with requested identifier labels. For example, as part of the activation and certification service provided by the system 12, the one or more identifier labels may have a specific time frame associated with them, such as an expiration date. Accordingly, the requesting user must attempt activation of the one or more identifier labels within the associated time frame in order for the system to authenticate the attempted activation. For example, the authentication/activation module 42 may compare data received from a user device, which may be timestamped, with the request data, including the specific time frame, to determine whether the timestamped data is within the allotted time frame associated with the request data. If the data received from the device is outside of the time frame, then the system 12 will deny activation of the identifier labels. Additionally, or alternatively, the specific parameters tied with the requested identifier labels may include a geographic location. Accordingly, the requesting user must attempt activation of the one or more identifier labels within the geographic location specified and tied to the requested identifier labels in order for the system to authenticate the attempted activation. For example, the authentication/activation module 42 may compare data received from a user device, which may include a geolocation or GPS tag or the like, with the request data, including the specific geographic location, to determine whether the attempted activation is within the specified geographic location tied to the request data. If the data received from the device is outside of the required geographic location, the system 12 will deny activation of the identifier labels. Upon authenticating the data, the one or more non-activated identifier labels are activated for use (operation 750).

Figure 8:
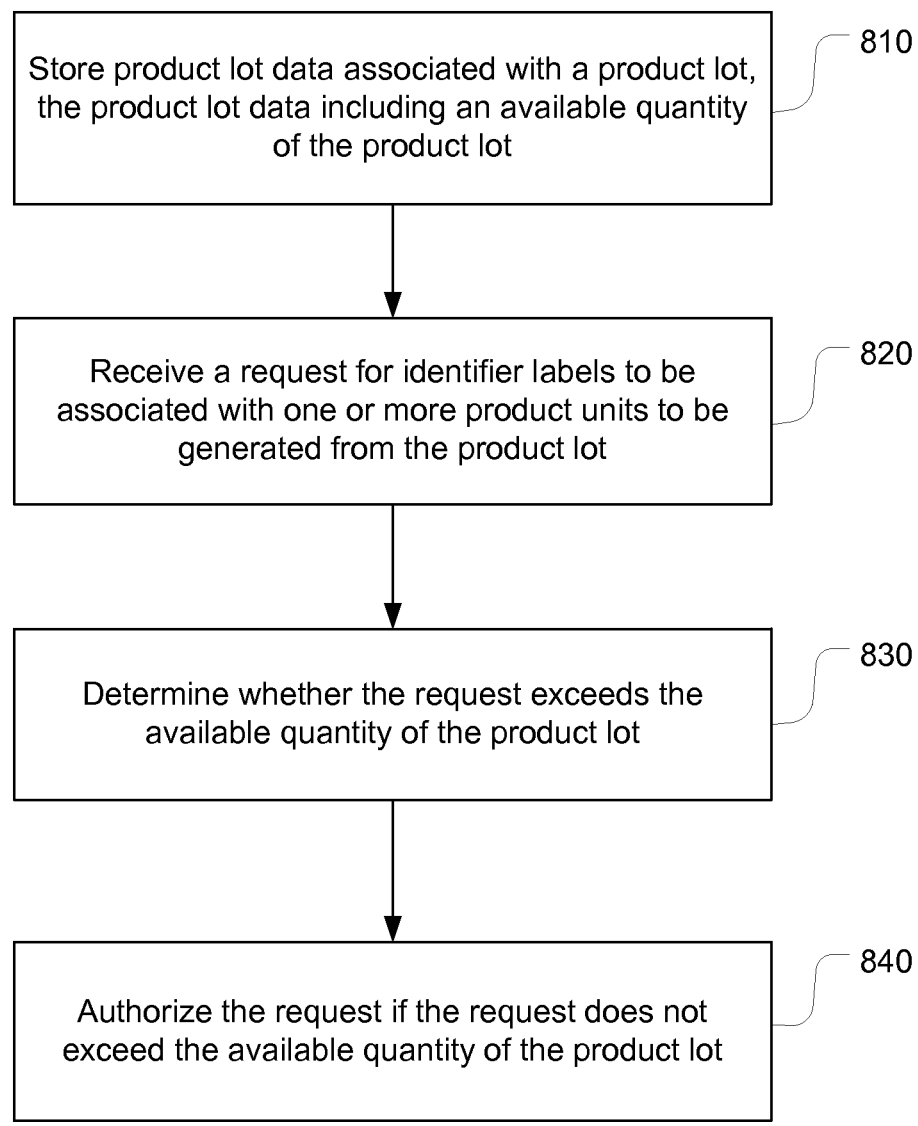
FIG. 8 is a flow diagram illustrating one embodiment of a method for authenticating a request for the issuance and use of identifier labels to be used for tracking products from a product lot within a supply chain.

In other aspects, the invention provides the ability to act as a third-party certifier of goods sold to consumers. Similar to method 700 of FIG. 7, FIG. 8 is a flow diagram illustrating one embodiment of a method 800 for authenticating a request for the issuance and use of identifier labels to be used for tracking products from a product lot within a supply chain. The method 800 provides improved regulation of supply chain management, particularly when dealing with specialty products where it is important to maintain and certify the authenticity of such products.

The method 800 includes storing product lot data associated with a product lot, wherein the product lot data includes a total quantity of product lot, a quantity of the product lot that has already been authorized for identifier labels, and an available quantity of the product lot (operation 810). In the instance of coffee distribution, for example, a product lot may include a batch of roasted coffee, for example. As shown in FIG. 4B, for example, the retailer may be responsible for separating a batch of roasted coffee into smaller portions for subsequent sale to the consumer (e.g., 12 oz. bags) (Event 5). The data associated with the batch of coffee may already be registered with the system 12, as the roasted coffee provided to the retailer from the importer (Event 4) was likely recorded. The product lot data may include, but is not limited to, identity of the product lot, characteristics of the product lot, location of the product lot, identity of product units already authorized for identifier labels, characteristics of the product units, location of the product units, transactional data related to one or more exchanges of product units generated from the product lot, and a combination thereof.

The method 800 further includes receiving a request for identifier labels to be associated with one or more product units to be generated from the product lot (operation 820). In the current example, the retailer may want to separate the batch of roasted coffee into the smaller 12-ounce bags for consumer purchase. Accordingly, the retailer may request identifier labels to be associated with the 12-oz. bags. The request data may include, but is not limited to, the identity of the requestor, characteristics of the requestor, location of the requestor, characteristics of the location of the requestor, data associated with a unit or product to which the one or more identifier labels is to be associated, and a combination thereof.

The characteristics of the requestor may include, background information, qualifications or certifications, historical information associated with one or more prior requests, and a combination thereof. The data associated with the unit or product includes, for example, an identity of the unit, characteristics of the unit, location of the unit, characteristics of location of the unit, and a combination thereof. The characteristics of the product or unit may include physical attributes of the unit, origin of the unit, destination of the unit, and a combination thereof. The characteristics of the location of the product or unit may include, but are not limited to, an operator of the location, overall capacity of the location, current capacity of the location, seasonality of the location, operational status of the location, current weather at the location, and a combination thereof. The characteristics of the location of the requestor may include the operator of the location, overall capacity of the location, current capacity of the location, seasonality of the location, operational status of the location, current weather at the location, and a combination thereof.

The method 800 further includes determining whether the request exceeds the available quantity of the product lot (operation 830) and authorizing the request if the request does not exceed the available quantity of the product lot (operation 840). As previously described, the distributed database management module 24 is configured to review the requests and, based on authentication procedures, issue and/or authorize use of requested identifier labels. More specifically, the authentication/activation module 42 is configured to determine whether the request exceeds the available quantity of product lot based on a comparison of the available quantity of the product lot with the total sum of the quantities of product units requested to be generated from the product lot. For example, an available quantity of a batch of roasted coffee may be 1,200 ounces and the request may include a request for identifier labels to be associated with 100 12-oz. bags of coffee for retail. Accordingly, in this instance, analysis of the request is performed, such that the sum of the quantities of the bags of coffee is compared with the total available quantity of the batch of roasted coffee to determine whether the request is valid. In this instance, there is a sufficient available quantity of the roasted coffee to be evenly partitioned into the 100 12-oz. bags requested, such that the request does not exceed the total available quantity. Accordingly, the requested identifier labels will be authorized (e.g., generated, activated, and provided to the requestor or activating already pre-generated labels).

In some embodiments, the available quantity of the product lot may further be adjusted (e.g., decreased) in response to the quantity of product lot to be associated with the identifier labels of the authorized request. Accordingly, in the event that identifier labels are requested and authorized for 90 12-oz. bags of coffee, the available quantity of the roasted coffee may be adjusted accordingly to account for the allocated quantity of coffee to be associated with the authorized request. For example, the 1,200 ounces of coffee that were originally available may be reduced to 120 ounces, so as to account for the 90 12-oz. bags that have been authorized (e.g., 1,080 ounces that are accounted for).

In some embodiments, in the event that the sum of requested quantities of product units to be generated from the product lot exceeds the available quantity, the system 12 may be configured to only issue a limited number of identifier labels up to the corresponding quantity amount. For example, keeping in line with the previous example, but the request for identifier labels was to be associated with 110 12-oz. bags of coffee for retail, the system will limit issuance of 100 identifier labels (1 label for 1 12-oz. bag) so as to not exceed the total available quantity of 1,200 ounces.

Accordingly, the present invention allows the generation and/or authorization of labels is regulated and controlled in such a manner that it decreases the risk of mislabeling, either accidentally or deliberately. More specifically, by limiting the number of labels that can be issued, the present invention reduces the incentive to blend a certified product with a non-certified product as a means of misrepresenting the certification, since labels may only be procured up to the total quantity of the certified product. The "metered" quantity of certified product shown on the label gives the consumer the ability to compare the stated quantity against the actual quantity of the packaged product, making it more difficult to misrepresent uncertified product as certified.

The present invention is advantageous to both a seller and a consumer. For example, the present invention may help to reduce or completely eliminate the costly, and sometime faulty, process of site inspections included as part of current certification programs. The consumer greatly benefits from the comprehensive nature of the certification process provided by the present invention, specifically the metric approach that simply reduces a seller's incentive to misrepresent non-certified product as certified. Accordingly, the present invention reduces the likelihood of fraudulent activities to take place, such as food fraud or adulteration.

The third-party certifying aspects of the system 12 described herein further provide for the ability to generate a report card, or other form of evaluation, which may provide qualifications of a member in the supply chain and further indicate whether the member is qualified to provide a product under a particular certification regime (e.g., organic, Fair Trade, non-GMO, etc.). The system 12 may be configured to deliver such a report card to other members of the supply chain, including the consumer.

For example, in the coffee industry, many certification regimes have been introduced over the past 20 to 30 years, including Fair Trade, Rain Forest Alliance, Certified Organic, Bird Friendly, Shade Grown, 4C, UTZ, and CAFÉ Practices, among others. Coffee farmers and producers are recruited heavily to participate in one or more such programs, and similarly, roasters and retailers are encouraged to participate. Consequently, a single coffee may be certified under multiple programs, and a blended coffee may involve different sets of certifications for each component ingredient. In many instances, a retailer will add one or more seals or indicia to product packaging, asserting that the product is certified under one or more such programs. However, this practice can become complicated due to the multiple certifications that may apply to portions of a product. The report card is configured to provide a means of delivering a concise summary of the certifications that may apply to a given product, detailed by part, and not requiring the addition of many seals to be displayed on the packaging. Furthermore, because the report card is delivered within the context of a traceability system, there is the added benefit of verification that the product in the package is actually what it is claimed to be, and therefore that the certifications previously described are applicable.

In other aspects, systems and methods of the present invention further allow for a user, such as a seller, to define product variations and assign references to them at the point of sale or delivery. More specifically, the present invention allows a seller to assign or modify a reference associated with an identifier label, barcode, or similar device associated with a product at the point of sale or delivery, thereby changing the information delivered to the buyer based on details about the specific unit sold, the circumstances of the transaction, or the identity of the buyer. These details are often not known until the point of sale or delivery, when it is generally not be feasible to re-print a label or re-tag merchandise. In that manner, the present invention allows sellers of products and services to define and manage variations of a product or of a transaction that may be significant to themselves or their customers; then, at the point of sale or delivery, they may associate information specific to these variations with the physical product or service.

Figure 9:
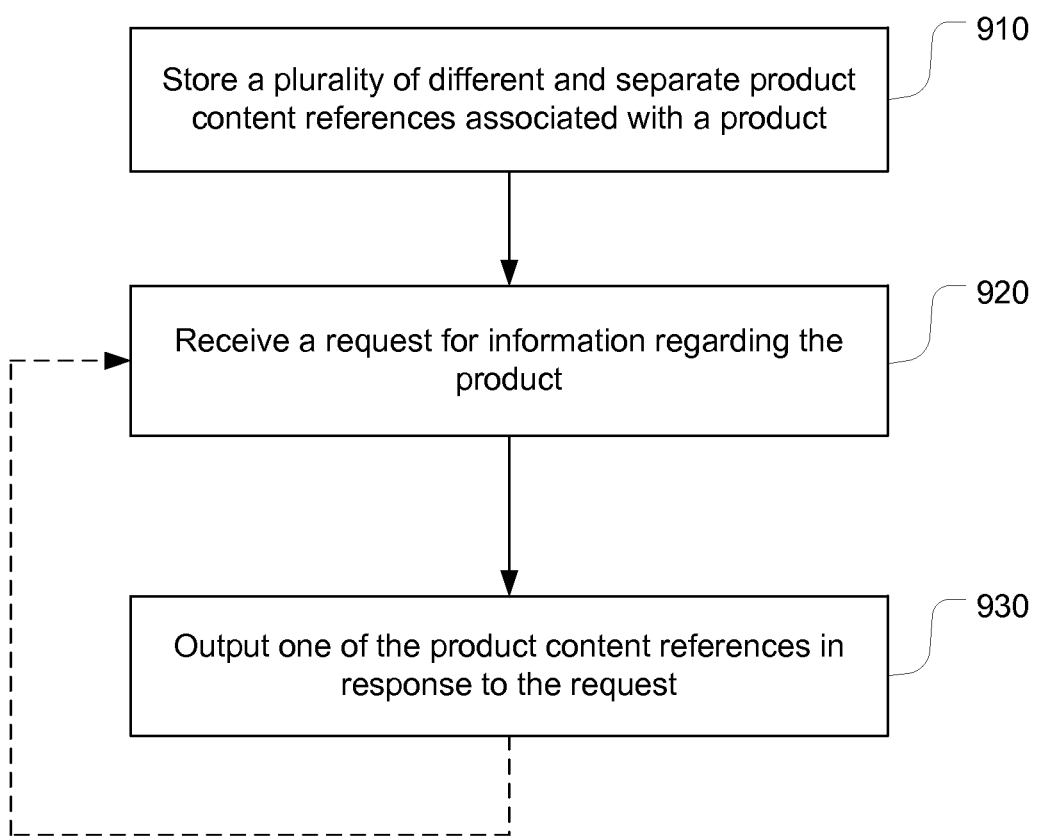
FIG. 9 is a flow diagram illustrating one embodiment of a method for providing product information to a user.

FIG. 9 is a flow diagram illustrating one embodiment of a method 900 for providing product information to a user, particularly in a dynamic format. The method 900 includes storing a plurality of different and separate product content references associated with a product (operation 910). The plurality of different and separate product content references may be stored in the product content database 36, for example, wherein the seller may have access to such database and can assign or modify the content to be associated with the product sold or to be sold. The plurality of different and separate product content references may include, for example, one or more product information links (e.g., uniform resource locator (URL)) directed to web-based informational data associated with the product. In some embodiments, some of the product content references may include a URL that is directed to one or more other URLs associated with other product content references, which will be described in greater detail herein.

The method 900 further includes receiving a request for information regarding the product sold or to be sold (operation 920) and outputting one of the pieces of the product content in response to the request (operation 930). The request may be based on request data including, but not limited to, the type of request, type of event associated with the request, location of the event, characteristics of the event, identity of one or more users (e.g., seller, consumer, etc.) associated with the request or event, location of the one or more users, characteristics of the one or more users, identity of the product associated with the request or event, location of the product, characteristics of the product, and a combination thereof. In some embodiments, the type of event may include a sale of the product between a seller and a consumer and the event characteristics includes transactional data including, but not limited to, identity of at least one of the seller and the consumer, quantity of product purchased, price paid for the product, date of the purchase of the product, and a combination thereof.

The product content reference may be outputted to a variety of devices configured to deliver informational data associated with the product content reference to a user. The devices may include, but are not limited to, a device operably associated with the request, a device operably associated with the product, and a device operably associated with the consumer. At least one of the devices associated with the request, the product, and the consumer are able to wirelessly transmit data via a wireless transmission protocol including, but not limited to, Bluetooth communication, infrared communication, near field communication (NFC), radio-frequency identification (RFID) communication, cellular network communication, the most recently published versions of IEEE 802.11 transmission protocol standards as of February 2015, and a combination thereof.

For example, aspects of the invention may utilize a "writeable" device, such as radio frequency identification device (RFID), such that a product content reference is stored directly on the device, as in the case of packaging, tag, or service vessel equipped with an RFID chip. The device may also be a "read-only" device, such as a barcode or other identifier label to be either printed on a receipt or attached to product packaging, such that the product content reference may be embedded on the barcode or label. The product content reference may also be transmitted directly to a network-enabled device in the consumer's possession, such as a mobile phone or electronic tablet, capable of receiving such a transmission.

In some embodiments, the device associated with the request includes a module configured to generate one or more identifier labels for providing the outputted product content reference to a consumer. The identifier labels may include a machine-readable label including, but not limited to, text, graphics, an image, a linear barcode, a matrix barcode, an RFID element, and a combination thereof. The module may therefor include a printer. As generally understood, the printer may also be part of the register or other computing device for recording a sale of a product. For example, upon making a purchase (e.g., seller processes sale on register), the register (e.g., user device) is configured to communicate with the integrated supply chain system 12 and thereby exchange data with the product content database 36. At the time of the transaction (part of the ringing up of the consumer), the seller may be presented with one or more machine-readable labels to provide to the consumer via the printed receipt. The seller may select the desired machine-readable label that they want to pass on to the consumer, at which point the printer is able to print a receipt with the selected machine-readable label (e.g. barcode to be scanned by consumer's smartphone and redirect them to a URL having informational content specific at least one of the product purchased, the consumer, and the seller. In this manner, the plurality of different and separate product content references can be modified on the fly so as to account for details associated with the product at the point of sale or delivery, including characteristics of the individual unit of product sold or delivered, the circumstances surrounding the transaction, as well as characteristics of the seller or consumer, while still providing traceability of that product. Accordingly, the systems and methods of the invention are able to provide comprehensive traceability of a product and other relevant information in a dynamic format.

In some embodiments, final consumers may access the integrated supply chain system 12 through user accounts and register their ownership of product units they acquire. This data may be shared with other users of the system, according to privileges the consumer may grant. Users may share this information with friends, or with fellow members of an organization, or with sellers. Accordingly, the system 12 is configured to allow consumers to assert claims of ownership, thereby creating links between their user account in the user database 26 and the product they purchased within the product database 28.

As the system 12 may allow claims of ownership or registering of products purchased by the consumer, there are instances in which a person may attempt to falsely claim ownership so as to receive certain promotional items or incentives tied to the purchase of a given product. As will be described in greater detail herein, the distributed database management module 24 may include proprietary methods and algorithms for evaluating patterns of consumer claim assertion that may indicate abnormal or fraudulent use. For example, as described herein, the system 12 is configured to allow a final consumer to scan an identifier label associated with a product (e.g., barcoded label on product packaging) or otherwise provide the identity of an individual unit of the finished good they have purchased, together with their identity, to identify themselves as the final consumer of that product. In some embodiments, this data may be captured and delivered at the point of sale, as part of the transaction. In other instances, the consumer may initiate a separate transaction to advance the assertion.

The ownership or purchase data (e.g., consumer data related to assertion of product ownership) may include specific details of the product, details surrounding the transaction, and the like, which may be of value to a retailer or third party. In some instances, a retailer (e.g., seller) may offer incentives or credits associated with a particular product to be sold to the consumer. For example, a manufacturer or retailer may provide coupons or other incentives with the purchase of a product. Similarly, some manufacturers or retailers may often donate part of a sale to a particular "cause" or charity, which may be a development project, such as a water wells or the building of schools in an underdeveloped community associated with the product (e.g., coffee-growing community). The system 12 is configured to detect patterns of fraudulent use, such as the false claiming of ownership or purchase of a product so as to ensure that the rightful purchaser of a product is provided with the associated promotion, claim, or "cause".

For example, in maintaining the example of coffee, a grocery store may stock a particular brand of coffee in standard 12-oz. bags. The manufacturer or retailer of the coffee may be running a promotion or incentive tied to the purchase of the bags of coffee. Accordingly, each bag may have a barcoded label (or other identifier label, such as a promotion code) available for the consumer to use to assert that they purchased the coffee and thus can register for the promotion or incentive (e.g., coupon on next coffee purchase). Accordingly, a first consumer may visit the store and simply scan all the bags of coffee on the shelf, without actually purchasing the coffee, thereby asserting they are the final consumer in order to collect the credit or incentive, but without purchase. Subsequently, other consumers may actually purchase those bags of coffee and attempt to assert their own claims of ownership. However, because the first consumer already registered each of those bags, subsequent consumers who actually purchased the bags of coffee, are unable to receive the promotion or incentive, to which they are rightfully entitled.

As previously described, the process of registering ownership may include the collection of ownership or purchase data, including, but not limited to, details about the product, details about the consumer attempting to claim ownership (e.g., consumer identity, including personal information), and details about the transaction (e.g., transaction date, transaction location, etc.). The distributed database management module 24 may include proprietary methods and algorithms for evaluating patterns of consumer claim assertion that may indicate abnormal or fraudulent use. For example, the distributed database management module 24 may be configured to detect multiple claims of ownership against the same product units by different users, thus indicating a possible attempt by one of the users to falsely claim ownership. The distributed database management module 24 may deploy specific proprietary algorithms to identify consumers engaged in advancing fraudulent claims. For example, the distributed database management module 24 may be configured to recognize a pattern from a single user of attempted ownership claims over product units that have other users attempting to claim ownership, thus generating a level of possible fraud for a given user.

While FIGS. 5-9 illustrate method operations according to various embodiments, it is to be understood that in any embodiment not all of these operations are necessary. Indeed, it is fully contemplated herein that in other embodiments of the present disclosure, the operations depicted in FIG. 8 may be combined in a manner not specifically shown in any of the drawings, but still fully consistent with the present disclosure. Thus, claims directed to features and/or operations that are not exactly shown in one drawing are deemed within the scope and content of the present disclosure.

Additionally, operations for the embodiments have been further described with reference to the above figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

Figure 10:
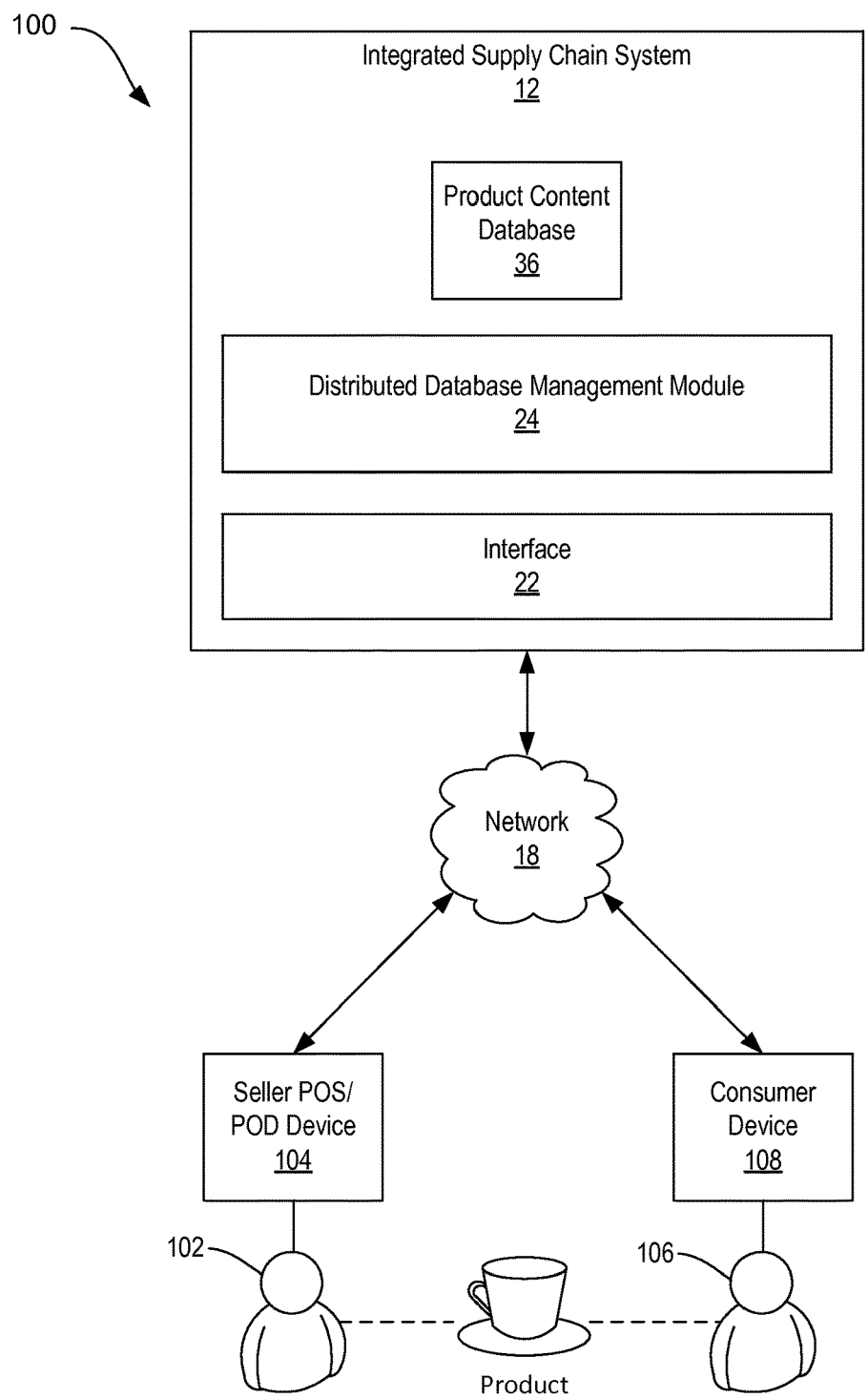
FIG. 10 is a block diagram illustrating an exemplary system for providing product information to a user, particularly in a dynamic format.

FIG. 10 is a block diagram illustrating an exemplary system 100 for providing product information to a user, particularly in a dynamic format in accordance with the method 900 previously described herein. The system 100 may generally be provided in a seller/buyer scenario, such as at a retail level in which a seller 102 is providing a product for sale and the buyer 106 is either purchasing or contemplating purchase of the product. As shown, the system 100 is configured to allow the seller 102 to define product variations and assign references to the product at the point of sale or delivery. It should be noted that the terms "variations" and "product content references" may be used interchangeably herein.

The system 100 allows the seller 102 to assign or modify a reference associated with an identifier label, barcode, or similar device associated with a product at the point of sale or delivery, thereby changing the information delivered to the buyer 106 based on details about the specific unit sold, the circumstances of the transaction, or the identity of the buyer 106. These details are often not known until the point of sale or delivery, when it is generally not be feasible to re-print a label or re-tag merchandise. In that manner, the present system 100 allows sellers of products and services to define and manage variations of a product or of a transaction that may be significant to themselves or their customers; then, at the point of sale or delivery, they may associate information specific to these variations with the physical product or service.

As shown, the system includes a seller point of sale (POS)/point of delivery (POD) device 104 associated with the seller 102 and a consumer device 108 associated with the buyer or consumer 106. The POS/POD device 104 and consumer device 108 are generally embodied as a computing device configured to communicate and exchange information with the integrated supply chain system 12, in a similar manner as the user devices described previously herein. Accordingly, the POS/POD and consumer devices 104, 108 may be embodied as, without limitation, a computer, a desktop computer, a personal computer (PC), a tablet computer, a laptop computer, a notebook computer, a mobile computing device, a smart phone, a cellular telephone, a handset, a messaging device, a work station, a distributed computing system, a multiprocessor system, a processor-based system, and/or any other computing device configured to store and access data, and/or to execute software and related applications consistent with the present disclosure. The POS/POD device 104 may include a computing system for processing and completing a transaction, such as a purchase of the product. Accordingly, the POS/POD device 104 may include a sales register, including other peripherals such as a receipt printer, barcode scanner, and the like. In the current scenario, the consumer device 108 may include a mobile computing device, such as a smart phone, or the like.

The POS/POD device 104 may include a particular software application configured to allow the seller 102 to communicate with at least the product content database 36 of the integrated supply chain system 12 for requesting, creating, modifying, deleting, or otherwise managing a set of variations to provide to the consumer 106 for providing informational data related to the product. For example, the seller 102 may, by way of variation software on their POS/POD device 104, define and manage a set of variations related to one or more products or transaction types and further associate with each such definition a unique information address of the sort used to retrieve information over a public communication network, such as the Unique Resource Locator (URL) commonly used to access information via the network 18. Subsequently, at the point of sale or delivery, the seller 102 may use the same or a related software application to access and select one of these pre-defined variations. At this point, the seller 102 may also have a means of accessing and applying key information about the consumer 106 to the transaction, such as a consumer's name, or a unique identity code associated with the consumer 106, or the name or identity of an associated group. Provided with such inputs, the POS/POD device 104 may retrieve a corresponding information address, incorporating buyer information as available, and transmit and store this information according to one or more usage scenarios (e.g., by way of a writeable device, read-only device, or direct transmission to a the consumer device 108), each of which is described in greater detail herein.

In some instances, traceability data or product content data may be exchanged with third-party providers who either produce or consume traceability data. For example, the integrated supply chain system 12 may communicate with such third-party providers to acquire or deliver traceability data related to product units registered in the product database 28, or product content data related to products registered in the product content database 36. Such exchange of data may take the form of non-real-time transfers of quantities of data into or out of the integrated supply chain system 12, or they may take the form of real-time data transfers of small quantities of data that may be required to service individual requests on a real-time basis. Relative to such use, the invention incorporates a published protocol describing data exchange formats, as well as methods and systems for connecting to external data sources, acquiring data electronically, and parsing and processing received data.

As shown in FIG. 10, the seller 102 is able to access and communicate with the product content database 36 by way of the integrated supply chain system 12. In turn, the seller 102 may gain access to a variation repository equipped with data storage capacity sufficient to create, retrieve, update, and delete records describing the individual variations. At any point (e.g., during a transaction, prior to a transaction, or after a transaction) the seller 102 is able to define one or more variations (VAR1-VAR3) and store them in the variation repository. The variations are generally associated with products or services. The variations may be associated with different physical properties of a product, such as size or color, or with the variety or provenance of an ingredient used in a prepared food product. They may also describe properties related to the specific transaction, such as the identity of the consumer or seller. In each case, each of the variations will generally be tied to, or otherwise associated with, at least one product information links (e.g., uniform resource locator (URL)) directed to web-based informational data associated with the product. Additionally, or alternatively, in some embodiments, a variation may be tied to a URL that is directed to one or more other URLs associated with other variations. Accordingly, a first URL on a pre-printed label may reference a second URL stored within the database, where the second URL may be modified at the POS to reference the product informational data. Thus, a pre-printed, or static label, can be used to deliver dynamic content.

The seller 102 may be provided with an interface (GUI) via their POS/POD device 104 in which the seller 102 may interact with for the management of variations. For example, a seller 102 may be able to specify details of a variation including, but not limited to, a descriptive name for the variation and a URL referencing a body of online resources the seller 102 intends to deliver to the consumer 106. The URL may include one or more placeholders for specific information accessed and entered at the point of sale. When the seller 102 signals completion of their created or modified variation, the variation input data can be transmitted to the product content database 36 generally in a compatible data exchange format such as JSON. Upon receipt of the data, the product content database 36 may perform validation checks and then package the variation data in a database query format. Upon passing validation, the product content database 36 may then transmit the data to the variation repository, where variation data may be stored as a record, which may be accessible by a unique identifier within the repository. The seller 102 may have an account with the system 12 (e.g., stored in the user database 26) such that variations stored in the variation repository may be tied to the seller's account in the user database 26. Accordingly, upon successfully signing into and gaining access to the system 12, the system 12 is configured to recognize the seller and further provide access to the seller's variations.

At the point of sale or delivery of the product, the seller 102 is able to select one of the variations previously stored. For example, during the transaction process (e.g., ringing up a sale of the product at the register), the POS/POD device 104 may provide the seller 102 with a list of variations currently associated with the requesting seller's 102 account. At this point, the seller 102 may select one of a plurality of variations available based on the product being sold. Accordingly, upon selecting a variation, the seller is then able to select the mode of transmission for delivering the variation and associated URL to the consumer 102 (e.g., via writeable device, read-only device, or direct transmission to consumer device 108), as will be described in greater detail herein. Additionally, or alternatively, at the point of sale or delivery of the product, the seller 102 may also be able to define a new variation according to the particular circumstances of that transaction. The seller 102 may also acquire or access an identifier associated with the consumer 106. For example, in delivering a cappuccino to a consumer 106 in a coffee shop, a barista may select one of a plurality of different variations available according to the specific type of coffee used to prepare the beverage, and then scan a buyer identity code presented by the consumer 106.

Figure 11:
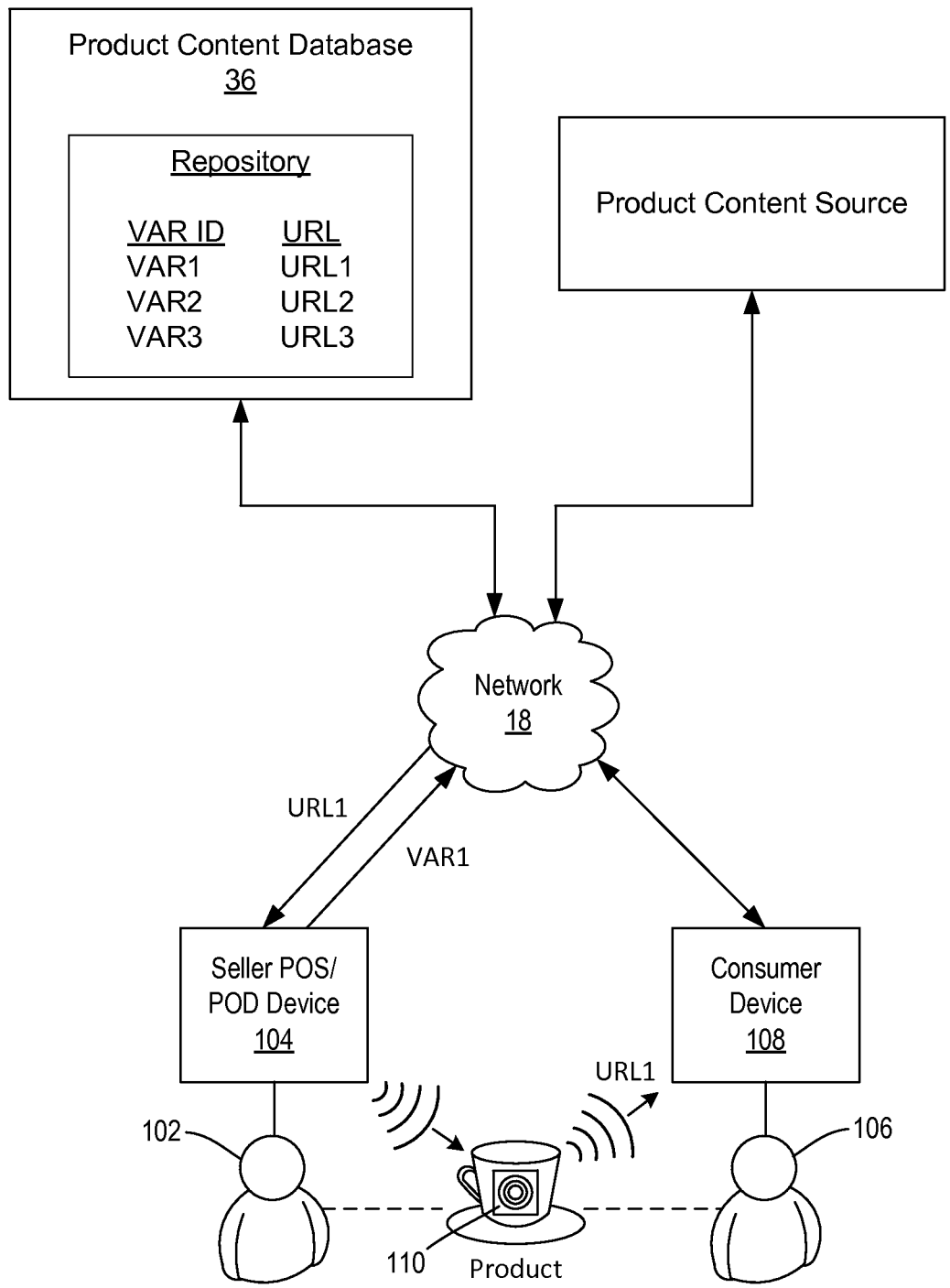
FIG. 11 is a block diagram illustrating one embodiment of the system of FIG. 10 for providing product information to a user via a writeable device.

FIG. 11 is a block diagram illustrating one embodiment of the system of FIG. 10 providing product information to a user via a writeable device 110. As shown, a variation may be transferred from a seller POS/POD device 104 to a consumer device 108 by means of a writeable device 110 capable of storing data, such as an RFID tag, affixed to a product, product packaging, or serving vessel. In the present example, the product may be a cup of coffee. Accordingly, the RFID tag 110 may be affixed to the coffee cup. Upon selecting a variation via the POS/POD device 10, a variation identifier (VAR1) is transmitted by the POS/POD device 104 to the product content database 36 via the network 18. Upon receiving the variation identifier VAR1, the product content database 36 is configured to initiate a data retrieval transaction with an associated variation repository. Upon successful lookup, the variation repository returns the corresponding URL, indicated herein as URL1 to the POS/POD device 104. It should be noted that in some embodiments, variations may be stored locally on the POS/POD device 104, avoiding the need for repetitive network transactions. When the URL is received by the POS/POD device 104, it is passed to the write module of the device 110. The seller 102 can then initiate a write action, for example, by passing the serving vessel or packaging within the range of the RFID write mechanism of the POS/POD device 104, or by touching it to a designated surface. In so doing, the URL is transmitted and stored on the writeable device 110 affixed to the serving vessel or packaging of the product. Subsequently, the consumer 106 may use the consumer device 108, which may be equipped with an RFID or Near Field Communication (NFC) reader, to retrieve the stored URL from the serving vessel or packaging. The URL may then be used with conventional information retrieval software, such as a web browser, to access the target information intended by the seller 102 from a product content source (e.g., server addressed in the URL). The target information may be presented to the consumer 102, via the consumer device 108, in a variety of forms. For example, the target information may simply include a web page including information related to the product, the seller, the specific transaction, and the like. Furthermore, the target information may be provided to the consumer 102 in a social-media feed method, such that information may be pushed to the consumer device 108, similar to push notifications.

Figure 12:
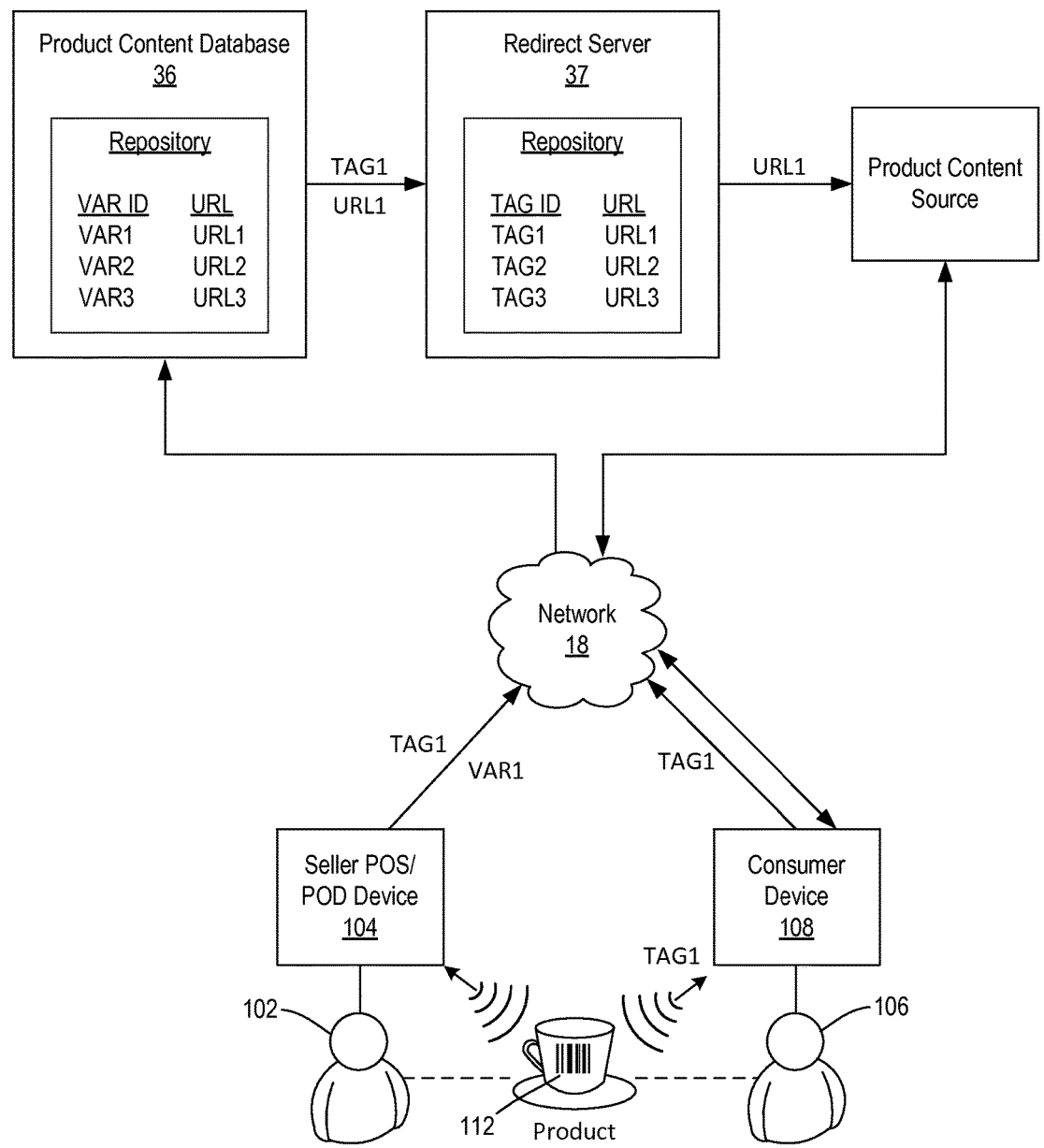
FIG. 12 is a block diagram illustrating another embodiment of the system of FIG. 10 for providing product information to a user via a read-only device.

FIG. 12 is a block diagram illustrating another embodiment of the system of FIG. 10 providing product information to a user via a read-only device 112. As shown, the transfer of variation data from a seller's POS/POD device 104 to a consumer's device 108 may be transmitted via a read-only device, such as an identifier label a barcode or other graphic device or pattern, affixed to a product, product packaging, or serving vessel. The seller's POS/POD device 104 is provisioned with a reader capable of scanning or imaging the barcode tag 112 retrieve a unique identifier encoded therein, designated as TAG1. The seller 102 may initiate a transaction by scanning the barcode from a serving vessel or package to retrieve the identifier TAG1, and by selecting a variation identifier VAR1 to associate with this unique identifier. The POS/POD device 104 transmits the selected variation identifier VAR1 together with the barcode identifier TAG1, to the product content database 36 over the network 18. Upon receiving VAR1 and TAG1, the product content database 36 is configure to initiate a transaction with the variation repository to retrieve the URL associated with the variation identifier VAR1. Upon successful lookup, the product content database 36 is configured to transmit TAG1 and URL1 to a redirect server 37. Upon receiving the TAG1 and URL1 pair, the redirect server 37 initiates a transaction with a redirect repository. The redirect repository receives TAG1 and URL1 and stores them together in a relational association.

Subsequently, the consumer 106 may use their device 108, which may be equipped with a barcode reader or imaging capability (e.g., barcode scanning application), to scan the barcode label 112 on the serving vessel or packaging and retrieve the unique identifier TAG1. The encoded contents of TAG1, in addition to the unique tag identifier, also include the address of the redirect server 37. Thus, the consumer 106, upon scanning the barcode label 112, may transmit TAG1 by means of conventional information retrieval software, such as a web browser, to the redirect server 37. Upon receipt of TAG1 from the consumer device 108, the redirect server 37 transmits TAG1 in the form of a query to the redirect repository. The redirect repository, upon receipt of the query, uses TAG1 as an index to retrieve the associated URL1 from the repository. The redirect server 37 is then configured to transfer the consumer's request transaction to the product content source referenced by URL1. The transfer of the consumer's request may be accomplished by means of conventional network protocols recognized by network-based information services, such as HyperText Transfer Protocol (HTTP). Upon receipt of the transferred consumer request, the product content source is configured to access the target information intended by the seller and to provide such target information to the consumer device 108 for presentation to the consumer 106, via conventional information viewer such as a web browser.

Figure 13:
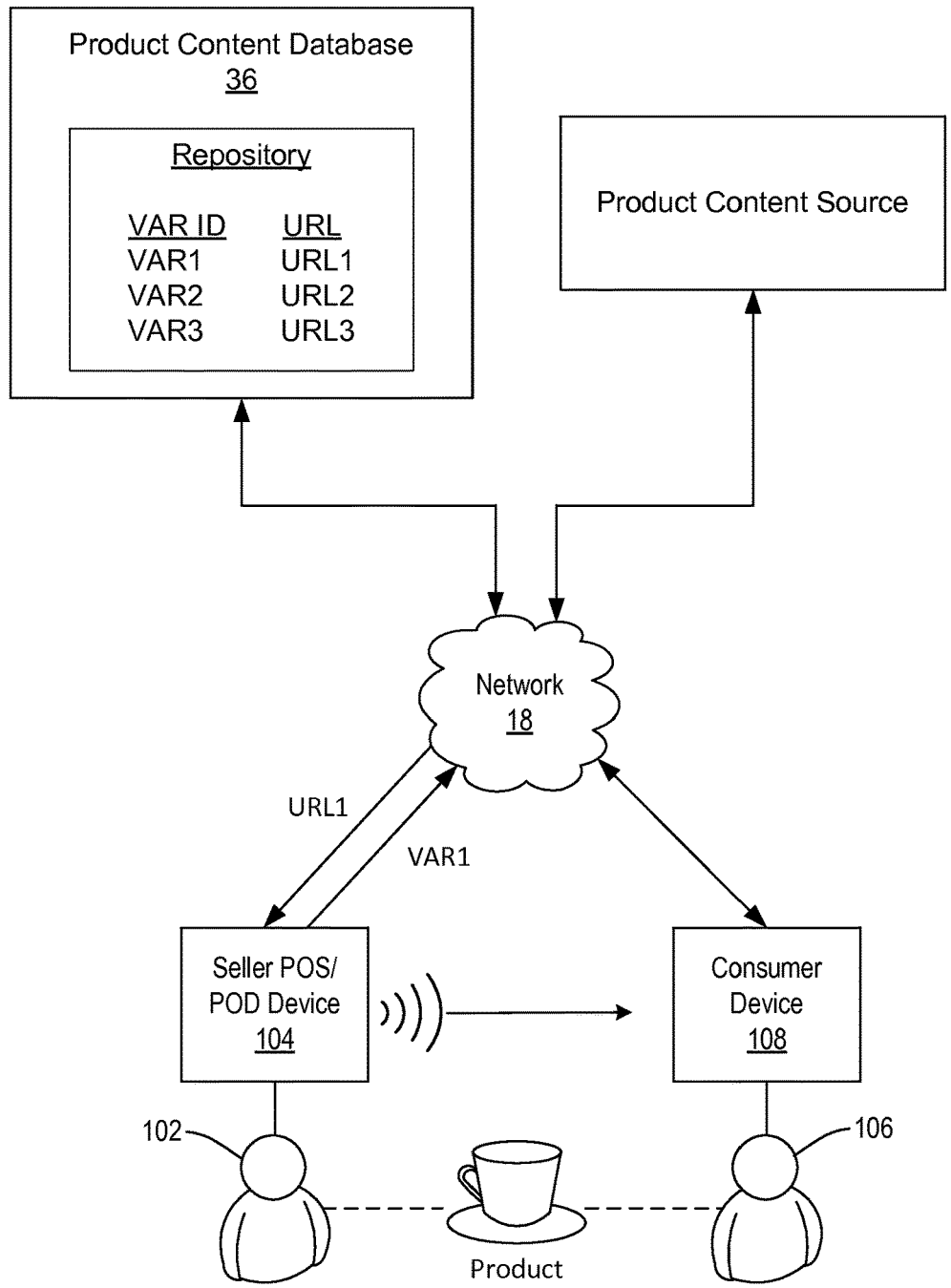
FIG. 13 is a block diagram illustrating another embodiment of the system of FIG. 10 for providing product information to a user directly to a user's computing device.

FIG. 13 is a block diagram another embodiment of the system of FIG. 10 providing product information to a consumer via direct transmission of such information to a consumer's device. As shown, variation data may be transferred from the seller's POS/POD device 104 directly to the consumer device 108. For example, upon a seller 102 selecting a variation (e.g., variation identifier VAR1), VAR1 may be transmitted by the POS/POD device 104 to the product content database 36. Upon receiving VAR1, the product content database 36 initiates a data retrieval transaction with the variation repository. Upon successful lookup, the variation repository returns the corresponding URL, indicated herein as URL1, to the requesting product content database 36. The product content database 36 then returns the URL1 to the seller's POS/POD device 104. When the URL1 is received by the POS/POD device 104, it is transmitted to the consumer device 108 via any known wireless transmission protocol, as previously described herein. The URL1 may then be used with conventional information retrieval software, such as a web browser, to access the target information intended by the seller from the product content source associated with the URL.

Figure 14:
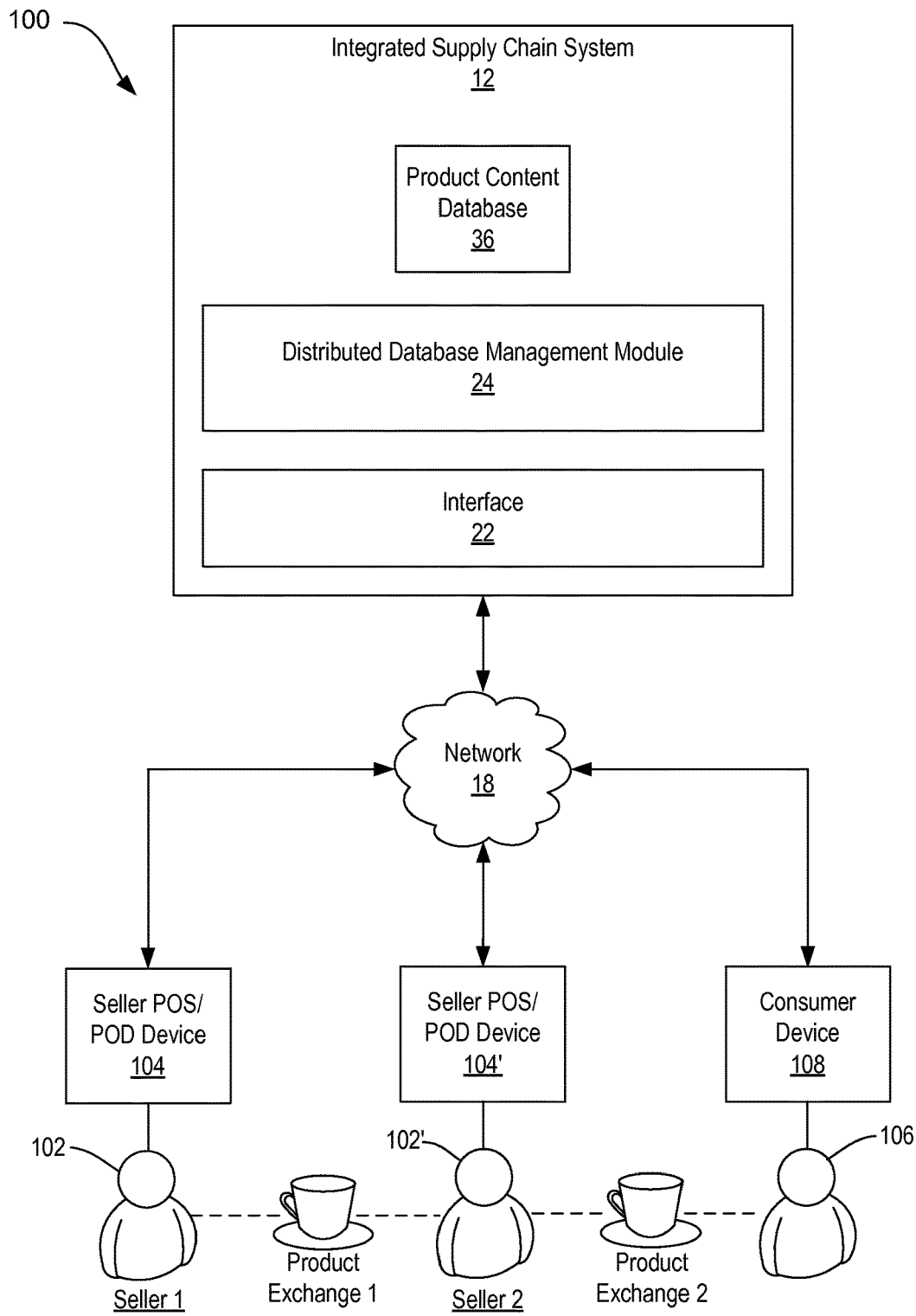
FIG. 14 is a block diagram illustrating another embodiment of the system of FIG. 10 for providing product information to a user based on the exchange of the product between at least two different sellers.

FIG. 14 is a block diagram illustrating another embodiment of the system of FIG. 10 for providing product information to a user from two parties. In some instances, product information may be provided by more than one party as a product is transferred to a consumer. As shown, product information from two parties may be provided to a consumer, in a series of transactions via an intermediary retail channel. In this example, the first seller 102 of a product, such as coffee roaster, delivers units of a finished good (e.g., 12-oz. bags of roasted coffee), to a second seller 102' (e.g., a grocery store or other retail outlet), who will, in turn, sell the 12-oz. bags of roasted coffee to the consumer 106. Similar to the scenario of FIG. 12, at the point of delivery (POD) to the second seller 102', as the finished goods are packaged for delivery to the retail outlet, the first seller 102 may scan the units and associated a product variation with the particular units being delivered, this variation referencing certain product content. This variation may include the identity of the second seller 102' (such as the retail outlet). Subsequently, the second seller 102', through their own account in the integrated supply chain system 12, may then access the product content database 36, access the variation assigned, and then produce and associate additional product content with that variation. In this way, the second seller 102' may append unique product content for delivery to the consumer 106. This action may be performed at the point of sale (POS), in a similar manner described in FIG. 11, 12, or 13. The second seller's product content may include coupons, incentives, news, promotional, or informational content about the product or other related products, the location of the transaction, information about the second seller, and a combination thereof. The product content may be specific to the transaction, to the location of the transaction, to information about the individual consumer known to the second seller, and a combination thereof.

Figure 15:
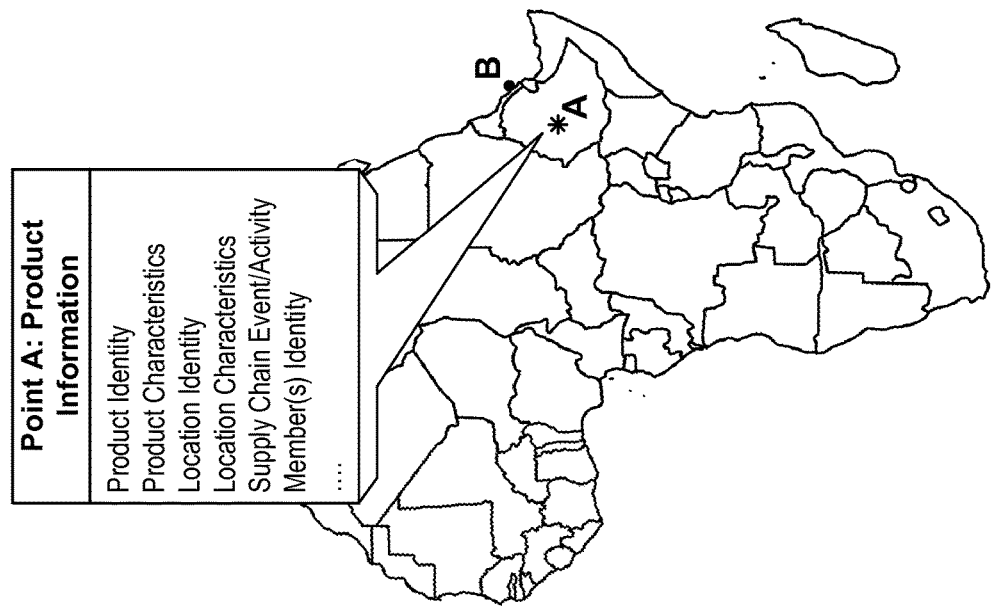
FIG. 15 shows an exemplary visual representation of product information outputted to a user device.
Figure 15:
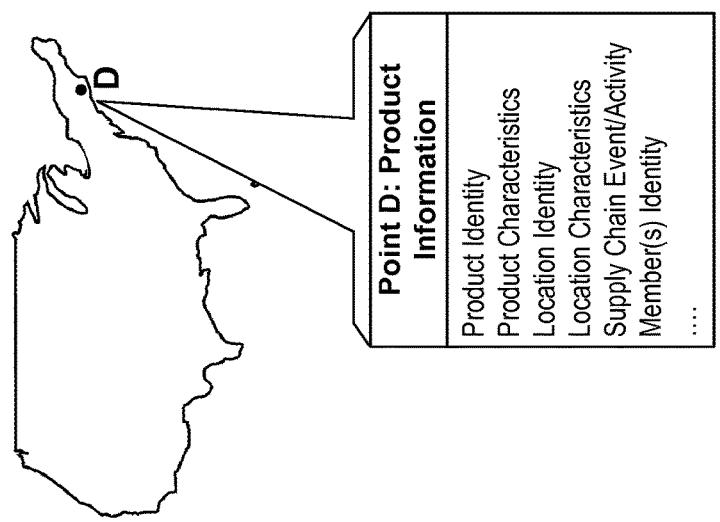

As previously described, the interface 22 of the integrated supply chain system 12 is configured to present product information to a user 16 via the user's computing device based, at least in part, on data received by the system 12. In some embodiments, the system 12 is configured to output product information to a user in the form of a visual representation, such as an image or illustration, with which the user may interact via their GUI on their user device so as to view details regarding product information. For example, the system 12 may be configured to output product information to a user in the form of a visual rendering, such as a map, that includes traceability information in the form of geographic locations. As shown in FIG. 15, for example, a user may be presented with a map that includes various geographic locations (points A-D) associated with product movement and/or product handling/processing from a point of origin all the way through to the final exchange with a consumer. It should be noted that the map depicted in FIG. 15 is merely for purposes of illustration and the system of the present disclosure is configured to output other types of visual and interactive renderings for conveying product information. For example, the system 12 may be configured to generate and provide interactive timelines, reports, graphical representations, and the like.

The system 12 may be configured to aggregate information and generate a visual rendering of product information to provide to a given user in response to a request. For example, a user may access the system 12 and, in the event they are authorized, may request product information. In some instances, the request may be explicit in the sense that the user is logged into the system 12 and actively seeks the product information. Accordingly, the user may be provided with real-time visibility to traceability information of the product (e.g., current location, previous locations, upcoming locations or destinations). In other instances, as described with references to FIGS. 10-14, the request for product information may be somewhat passive (e.g., user scans a barcoded label on product packaging).

The user may interact with the map so as to obtain specific details about a product. For example, the map of FIG. 15 depicts a visual representation of geographic locations (points A-D) associated with the movement of coffee from a point of origin at point A (e.g., farmer) all the way through to the final exchange of the coffee with a consumer at point D (e.g., sale of cup of coffee). In this instance, the user may be a consumer who has just purchased the cup of coffee and is interested in viewing information about that cup of coffee.

However, it should be noted that the output of visual representation of product information, as described herein, may be provided to any one of the users associated with the supply chain, including, but not limited to, a manufacturer, producer, exporter, retailer, store owner, destination owner, etc. The user may interact with the map by simply selecting one of the points A-D so as to view product details associated with the geographic location selected.

The type of product information available at any given point (any of points A-D) may be based on the location associated with that point, the event or activity associated with that point, or other factors. As shown, a user may select point A, at which point the system 12 may further provide product information associated with that particular geographic location. Point A may generally correspond to the point of origin of the coffee (e.g., location in which the coffee was grown and harvested and possibly initially processed). Accordingly, the product information of point A may include, for example, the identity of the coffee product (e.g., name of coffee) and the characteristics of the coffee product (e.g., physical attributes of the coffee, including grading or classification, as well as the type of coffee product, which could be coffee cherry or parchment coffee, as point A is the point of origin). The product information may also include the identity of the location as well as characteristics of the location. In the instant example, the location may be a village or town in Ethiopia in which the coffee cherry was grown, harvested, and/or processed. The characteristics of the location may include the operator of the location, overall capacity of the location, current capacity of the location, seasonality of the location, operational status of the location, current weather at the location, and the like. The product information may further include details regarding an event or activity associated with point A. For example, the type of event may include the harvesting and subsequent sale of coffee cherry from the farmer to a producer or the processing of coffee cherry to produce parchment coffee. The details may include the date of harvest or processing, the total quantity harvested or processed, and the like. The product information may further include details about one or more members involved in the event, including details about the farmer and/or producer. The details may include a bio of the farmer or producer, harvest history of the farmer, processing history of the producer, and the like.

Upon selecting point D, the user may access product information associated with the sale of a cup of coffee to a consumer. Accordingly, some of the details of the coffee product have since been updated and additional details have been included at point D, as the product has moved through the supply chain and undergone multiple events/activities and exchanged hands multiple times. In this instance, the coffee product is no longer coffee cherry or coffee parchment, but rather a roasted coffee that has been brewed and served as an individual serving. Furthermore, the roasted coffee may include a blend of units of coffee product and may not be entirely composed of a single source of coffee bean, as previously described herein. For example, multiple units of parchment coffee may be blended during a milling process, thereby resulting in a blended green coffee (e.g., occurring at point B), and the blended green coffee may be further blended with other green coffee units during a roasting process. However, as previously described herein, the system 12 is configured to track individual units even when those individual units are split or combined with other individual units. Accordingly, the system 12 is able to provide a user with traceability information all the way back to the point of origin (point A).

Accordingly, the product information of point D may still include similar product information as was provided in point A (e.g., same identity of the coffee product, some of the similar characteristics of the coffee product, such as Arabica bean). However, the type of coffee product is now roasted coffee and the location of the coffee product has been updated to reflect the location of purchase (e.g., coffee shop in the United States). The characteristics of the location may include the operator of the location (e.g., name of the seller) and details about the seller. The product information may further include details regarding an event or activity associated with point D. For example, the type of event may include the sale of the cup of coffee from the seller to the consumer. The details may include the date of sale, the price paid for the cup of coffee, quantity of the cup of coffee, the type of the cup of coffee, and the like. The product information may further include details about one or more members involved in the event, including details about the seller and consumer. The details may include a bio of the seller, history of the seller producer, and the like.

It should be noted that at any point, a user may be able to navigate through the interface so as to pull up all types of product information associated with all events/activities occurring through the supply chain. For example, a user (in the event they have access) may be able to review the product information associated with point C (transportation of the product), which may include product transit logs, and the like. Similarly, a user may review product information associated with point B (production of the coffee product, such as milling of parchment coffee to create green coffee). Accordingly, in addition to providing real-time visibility of a product, the system 12 is configured to provide all types of traceability information associated with a product all the way through the supply chain from the final destination back through to the point of origin.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. An authentication system comprising:
   a module configured to output one or more identifier labels; and
   a processor configured to communicate and transmit data with the module, the processor coupled to a memory containing instructions executable by the processor to cause the system to:
   store product lot data associated with a product lot, the product lot data comprising a total quantity of a product lot, a quantity of the product lot that has already been authorized for identifier labels, and an available quantity of the product lot;
   receive a request for one or more identifier labels to be associated with packaging of a corresponding one or more product units to be generated from the product lot, the request comprising either a request for generation of one or more activated identifier labels or a request for activation of one or more existing identifier labels;
   determine whether the request for the one or more identifier labels exceeds the available quantity of the product lot;
   authorize the request if the request does not exceed the available quantity of the product lot;
   command the module to generate the requested one or more activated identifier labels or activate one or more existing identifier labels generated by the module if the request is authorized; and
   dynamically associate the one or more identifier labels with the corresponding one or more product units to be generated from the product lot to thereby certify authenticity of the generated product units.

2. The system of claim 1, wherein the instructions executable by the processor further cause the system to adjust the available quantity of the product lot based on the quantity of product lot to be associated with the identifier labels of the authorized request.

3. The system of claim 1, wherein data associated with the request is selected from the group consisting of: identity of the requestor, characteristics of the requestor, location of the requestor, characteristics of the location of the requestor, identity of the one or more product units to be generated from the product lot, characteristics of the one or more product units to be generated from the product lot, transactional data related to an exchange of the one or more product units to be generated from the product lot, and a combination thereof.

4. The system of claim 3, wherein the characteristics of the one or more product units to be generated from the product lot are selected from the group consisting of: size or quantity of product unit, physical attributes of the product unit, origin of the product unit, destination of the product unit, and a combination thereof.

5. The system of claim 3, wherein the transactional data is selected from the group consisting of: identity of at least one entity associated with the exchange of the one or more product units to be generated from the product lot, quantity of the one or more product units exchanged, price paid for the one or more product units, date of the exchange of the one or more product units, and a combination thereof.

6. The system of claim 1, wherein the product lot data is further selected from the group consisting of: identity of the product lot, characteristics of the product lot, location of the product lot, identity of product units already authorized for identifier labels, characteristics of the product units, location of the product units, transactional data related to one or more exchanges of product units generated from the product lot, and a combination thereof.

7. The system of claim 1, wherein the instructions executable by the processor further cause the system to command the module to generate the requested identifier labels if the request does not exceed the available quantity of the product lot.

8. The system of claim 1, wherein the module comprises a peripheral device configured to receive instructions from the processor and generate the requested identifier labels, each identifier label comprises a representation of graphics or text on physical media in response to instructions from the processor.

9. The system of claim 1, wherein the requested identifier labels are non-activated and the instructions executable by the processor further cause the system to activate the requested identifier labels if the request does not exceed the available quantity of the product lot.

10. The system of claim 1, wherein at least one of the requested identifier labels comprises a machine-readable label selected from the group consisting of: text, graphics, an image, a linear barcode, a matrix barcode, an RFID element, and a combination thereof.

11. An authentication method comprising:
providing a module configured to output one or more identifier labels;
storing product lot data associated with a product lot, the product lot data comprising a total quantity of a product lot, a quantity of the product lot that has already been authorized for identifier labels, and an available quantity of the product lot;
receiving a request for one or more identifier labels to be associated with packaging of a corresponding one or more product units to be generated from the product lot, the request comprising either a request for generation of one or more activated identifier labels or a request for activation of one or more existing identifier labels;
determining whether the request for the one or more identifier labels exceeds the available quantity of the product lot;
authorizing the request if the request does not exceed the available quantity of the product lot;
commanding the module to generate the requested one or more activated identifier labels or activating one or more existing identifier labels generated by the module if the request is authorized; and
dynamically associating the one or more identifier labels with the corresponding one or more product units to be generated from the product lot, thereby certifying authenticity of the generated product units.

12. The method of claim 11, further comprising adjusting the available quantity of the product lot based on the quantity of product lot to be associated with the identifier labels of the authorized request.

13. The method of claim 11, wherein data associated with the request is selected from the group consisting of: identity of the requestor, characteristics of the requestor, location of the requestor, characteristics of the location of the requestor, identity of the one or more product units to be generated from the product lot, characteristics of the one or more product units to be generated from the product lot, transactional data related to an exchange of the one or more product units to be generated from the product lot, and a combination thereof.

14. The method of claim 13, wherein the characteristics of the one or more product units to be generated from the product lot are selected from the group consisting of: size or quantity of product unit, physical attributes of the product unit, origin of the product unit, destination of the product unit, and a combination thereof.

15. The method of claim 13, wherein the transactional data is selected from the group consisting of: identity of at least one entity associated with the exchange of the one or more product units to be generated from the product lot, quantity of the one or more product units exchanged, price paid for the one or more product units, date of the exchange of the one or more product units, and a combination thereof.

16. The method of claim 11, wherein the product lot data is further selected from the group consisting of: identity of the product lot, characteristics of the product lot, location of the product lot, identity of product units already authorized for identifier labels, characteristics of the product units, location of the product units, transactional data related to one or more exchanges of product units generated from the product lot, and a combination thereof.

17. The method of claim 11, further comprising commanding the module to generate the requested identifier labels if the request does not exceed the available quantity of the product lot, wherein the module comprises a printer device configured generate the requested identifier labels, each identifier label comprises a representation of graphics or text on physical media.

18. The method of claim 11, wherein the requested identifier labels are non-activated and the method further comprises activating the requested identifier labels if the request does not exceed the available quantity of the product lot.

19. The method of claim 11, wherein at least one of the requested identifier labels comprises a machine-readable label selected from the group consisting of: text, graphics, an image, a linear barcode, a matrix barcode, an RFID element, and a combination thereof.

* * * * *